United States Patent
Takahashi et al.

(10) Patent No.: US 11,417,242 B2
(45) Date of Patent: Aug. 16, 2022

(54) TECHNIQUE SIMULATOR

(71) Applicant: TERUMO KABUSHIKI KAISHA, Tokyo (JP)

(72) Inventors: Makoto Takahashi, Hadano (JP); Junichi Fukamizu, Yokohama (JP); Daiki Nozawa, Choufu (JP); Kouji Ozaki, Naka-gun (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 133 days.

(21) Appl. No.: 17/061,487

(22) Filed: Oct. 1, 2020

(65) Prior Publication Data
US 2021/0020071 A1 Jan. 21, 2021

Related U.S. Application Data

(63) Continuation of application No. PCT/JP2019/021830, filed on May 31, 2019.

(30) Foreign Application Priority Data

Aug. 7, 2018 (JP) .............................. JP2018-148494

(51) Int. Cl.
*G09B 23/30* (2006.01)
*G09B 23/28* (2006.01)

(52) U.S. Cl.
CPC ......... *G09B 23/303* (2013.01); *G09B 23/285* (2013.01)

(58) Field of Classification Search
CPC ....... G09B 23/28; G09B 23/30; G09B 23/303
See application file for complete search history.

(56) References Cited

U.S. PATENT DOCUMENTS 8,608,484 B2 * 12/2013 Kalafut ................. G09B 23/32
600/419
9,569,985 B2 * 2/2017 Alkhatib ................ G09B 23/30
(Continued)

FOREIGN PATENT DOCUMENTS

| CN | 106463067 A | 2/2017 |
| JP | 2000-342692 A | 12/2000 |

(Continued)

OTHER PUBLICATIONS

International Searching Authority, "Written Opinion," issued in connection with PCT Patent Application No. PCT/JP2019/021830, dated Aug. 27, 2019.

(Continued)

*Primary Examiner* — Kurt Fernstrom
(74) *Attorney, Agent, or Firm* — Foley & Lardner LLP

(57) ABSTRACT

A technique simulator for training in a technique using a catheter includes: a flow path configured to contain a liquid that imitates blood; a liquid flow generation member configured to generate flow of the liquid; and a catheter insertion port configured to allow the catheter to be interposed into the flow path. The flow path includes: a bifurcated portion that is located downstream of the catheter insertion port and is to be bifurcated into at least two flow paths, and a plurality of bifurcated flow paths provided downstream of the bifurcated portion. The plurality of bifurcated flow paths includes a first bifurcated flow path and a second bifurcated flow path. The technique simulator further comprises a pressure difference generation member configured to cause a pressure difference to be generated between a downstream side of the first bifurcated flow path and a downstream side of the second bifurcated flow path.

18 Claims, 16 Drawing Sheets

(56) References Cited

U.S. PATENT DOCUMENTS

| | | | |
|---|---|---|---|
| 9,589,484 B2* | 3/2017 | Higgins | G09B 23/303 |
| 9,844,383 B2 | 12/2017 | Allen | |
| 9,852,660 B1* | 12/2017 | Fairbanks | G09B 23/285 |
| 10,360,813 B2* | 7/2019 | Okayama | F04B 49/22 |
| 10,755,601 B2* | 8/2020 | Okayama | G09B 23/285 |
| 10,885,813 B2* | 1/2021 | Krummenacher | G09B 23/30 |
| 10,937,337 B2* | 3/2021 | Okayama | G09B 23/34 |
| 11,238,755 B2* | 2/2022 | Fiore | G09B 23/303 |
| 2002/0107504 A1 | 8/2002 | Gordon | |
| 2009/0246747 A1* | 10/2009 | Buckman, Jr. | G09B 23/285 434/272 |
| 2010/0196865 A1* | 8/2010 | Kays | G09B 23/32 434/268 |
| 2010/0217276 A1 | 8/2010 | Garrison et al. | |
| 2014/0322688 A1* | 10/2014 | Park | G09B 23/288 434/268 |
| 2014/0370490 A1* | 12/2014 | Iaizzo | A01N 1/0247 435/1.2 |
| 2015/0161347 A1 | 6/2015 | Christiansen et al. | |
| 2018/0108276 A1* | 4/2018 | Ishiyama | G09B 23/30 |
| 2019/0027064 A1* | 1/2019 | Nelson | G09B 23/30 |
| 2020/0135057 A1* | 4/2020 | Fatimi | G16H 50/50 |
| 2020/0242973 A1* | 7/2020 | Dodson | G09B 23/34 |

FOREIGN PATENT DOCUMENTS

| | | |
|---|---|---|
| JP | 2006-122354 A | 5/2006 |
| JP | 2014-032362 A | 2/2014 |
| JP | 2015-069054 A | 4/2015 |
| JP | 2017-111340 A | 6/2017 |
| WO | WO-2016/075732 A1 | 5/2016 |
| WO | WO-2017/195920 A1 | 11/2017 |
| WO | WO-2018/034074 A1 | 2/2018 |
| WO | WO-2018/079711 A1 | 5/2018 |

OTHER PUBLICATIONS

International Searching Authority, "International Search Report," issued in connection with International Patent Application No. PCT/JP2019/021830, dated Aug. 27, 2019.

International Searching Authority, "Written Opinion," issued in connection with International Patent Application No. PCT/JP2019/021830, dated Aug. 27, 2019.

Matsumoto et al., "Balloon-occluded arterial stump pressure before balloon-occluded transarterial chemoembolization," Minimally Invasive Therapy & Allied Technologies, vol. 25, No. 1, Sep. 25, 2015, pp. 22-28.

Chinese Search Report on CN Appl. Ser. No. 201980007428.X dated Mar. 17, 2022 (2 pages).

First Chinese Office Action on CN Appl. Ser. No. 201980007428.X dated Mar. 26, 2022 (15 pages).

* cited by examiner

FIG. 10

[TABLE 1]

| FLOW PATH | LENGTH OF FLOW PATH | DIAMETER OF FLOW PATH |
|---|---|---|
| FROM T-SHAPED TUBE 92 TO BIFURCATED PORTION 82a | 80 mm ± 20 mm | 4 - 5 mm |
| BETWEEN BIFURCATED PORTIONS 82a AND 82b | 40 mm ± 10 mm | 3 - 4 mm |
| BETWEEN BIFURCATED PORTIONS 82b AND 82c | 30 mm ± 10 mm | 2 - 3.5 mm |
| FLOW PATHS S1 TO S8 | 28 mm ± 10 mm | 1 - 3 mm |
| INTERLOCK FLOW PATH 85 (COLLATERAL BLOOD FLOW) | VARY DEPENDING ON PLACES | 1 - 1.5 mm |

TECHNIQUE SIMULATOR

CROSS-REFERENCE TO RELATED APPLICATIONS

This application is a bypass continuation of PCT Application No. PCT/JP2019/021830, filed on May 31, 2019, which claims priority to Japanese Application No. 2018-148494, filed on Aug. 7, 2018. The contents of these applications are hereby incorporated by reference in their entireties.

BACKGROUND

This disclosure relates to a technique simulator. Specifically, the disclosure relates to a technique simulator that can reproduce a blood flow state of a cancer and a tumor in a living body when treatment is conducted using a catheter, and with which an effect, a principle, and the like of surgery can be learned.

There are known techniques in which a diagnostic agent such as a contrast medium or a therapeutic agent such as an anticancer agent or an embolization material is administered through a catheter inserted into an artery to conduct a diagnosis and treatment, with respect to liver cancer, prostate cancer, uterine fibroid, and the like. In the treatment, it is desirable to selectively administer the therapeutic agent to a treatment target tissue of the cancer, the tumor, or the like, and prevent the therapeutic agent from flowing into a normal tissue as much as possible.

In recent years, attention has been focused on a phenomenon in which minute arterial blood vessels are excessively formed in the cancer tissue, and thus arterial flows can be concentrated. A technique called balloon-occluded transarterial chemoembolization (B-TACE) that uses this phenomenon and the like are reported in the following documents, for example.

Irie et al., "Dense Accumulation of Lipiodol Emulsion in Hepatocellular Carcinoma Nodule during Selective Balloon-occluded Transarterial Chemoembolization: Measurement of Balloon-occluded Arterial Stump Pressure", Cardio Vascular and Intervention Radiology, 2013, No. 36, p. 706-713

Matsumoto et al., "Balloon-occluded arterial stump pressure before balloon-occluded transarterial chemoembolization", Minimally Invasive Therapy & Allied Technologies, Sep. 25, 2015, the Internet <URL:http://www.tandfonline.com/action/journalInformation?journalCode=imit20>

U.S. Pat. No. 9,844,383

B-TACE is a method in which a therapeutic agent is administered in a state in which an artery upstream of a treatment target tissue is occluded with a balloon of a catheter distal end portion, thereby causing a local difference (pressure difference) in blood pressure between a normal tissue and the treatment target tissue to generate, and specifically concentrating the therapeutic agent to a treatment target site by moving the therapeutic agent along with the blood flow.

SUMMARY

However, it is difficult for a doctor who is familiar with the conventional treatment to intuitively understand such a phenomenon that is locally generated in the living body, and the fact is that it is difficult to say that these techniques are widely used in medical practice.

Therefore, there is a demand for a technique simulator with which it is possible to experience that a therapeutic agent can be selectively administered to a specific region due to a pressure difference that is generated by occluding a blood vessel with a balloon.

One aspect of the disclosure below is a technique simulator for training in a technique using a catheter, the technique simulator including: a flow path containing a liquid that imitates blood; a liquid flow generation member that generates flow of the liquid; and a catheter insertion port that causes the catheter to interpose into the flow path, in which the flow path includes a bifurcated portion that is provided downstream of the catheter insertion port and is to be bifurcated into at least two flow paths, and a plurality of bifurcated flow paths provided downstream of the bifurcated portion, and the plurality of the bifurcated flow paths include a first bifurcated flow path and a second bifurcated flow path, the technique simulator further including a pressure difference generation member that causes a pressure difference to generate between a downstream side of the first bifurcated flow path and a downstream side of the second bifurcated flow path, in which the liquid flow generation member generates a pressure higher than pressures to be applied to the downstream side of the first bifurcated flow path and the downstream side of the second bifurcated flow path.

With the technique simulator of the abovementioned aspect, the flow path at the upstream side from the bifurcated portion is occluded with the balloon catheter to generate a flow of the liquid that moves from one of the first bifurcated flow path and the second bifurcated flow path to the other thereof, due to a pressure difference. When the simulated therapeutic agent is administered from the terminal opening of the balloon catheter in this state, the simulated therapeutic agent flows along with the flow of the liquid generated due to the pressure difference. In addition, with the configuration in which the pressure difference can be kept, a phenomenon can be reproduced with a margin in time. Accordingly, a user can experience that the therapeutic agent can be selectively administered to a specific region due to the pressure difference that is generated by occluding a blood vessel with a balloon.

BRIEF DESCRIPTION OF THE DRAWINGS

FIG. 10 is a table 1 indicating the length and the diameter of respective flow paths in the second embodiment.

DETAILED DESCRIPTION

The following describes a plurality of preferred embodiments of a technique simulator with reference to the accompanying drawings.

Figure 1:
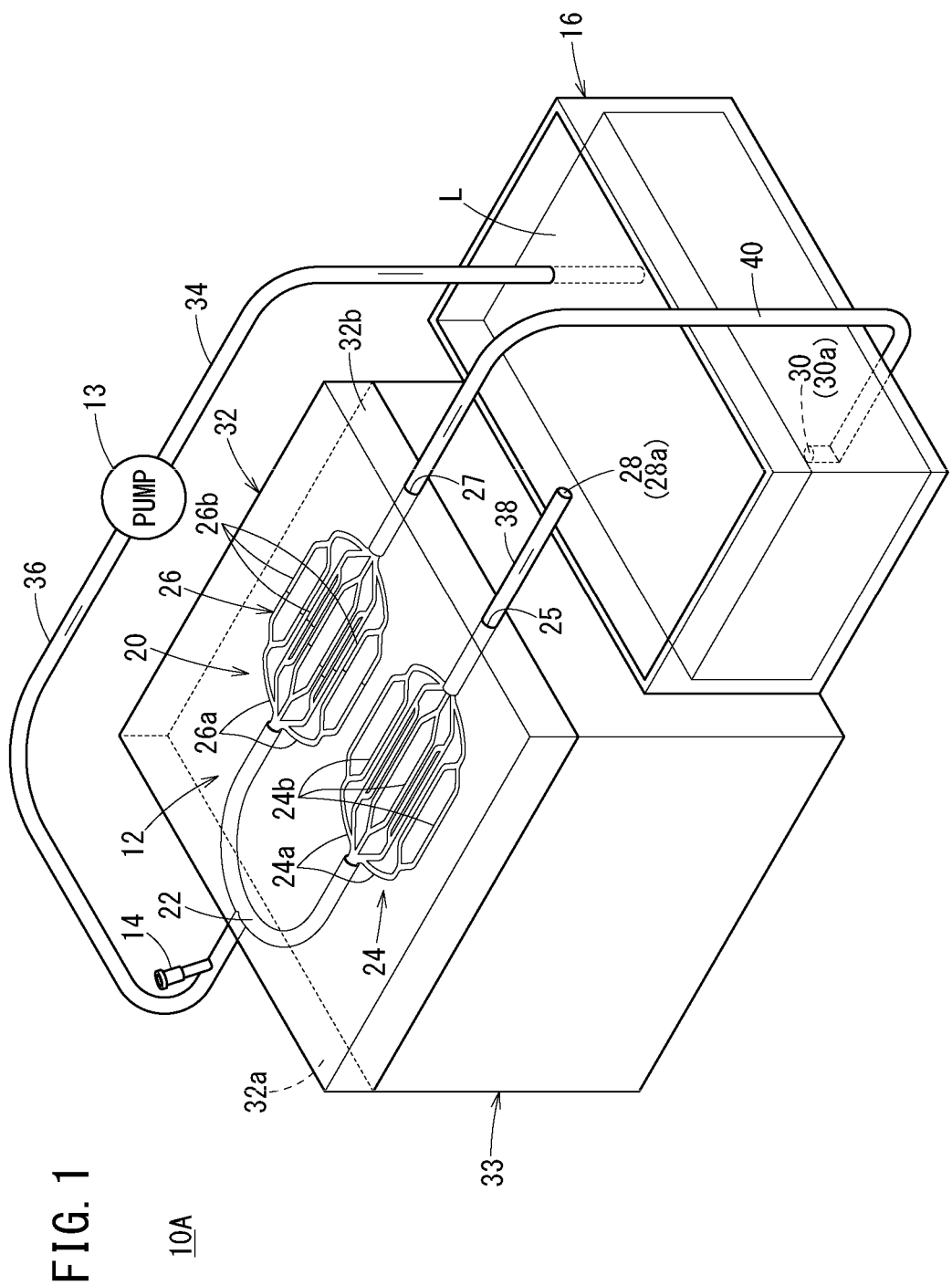
FIG. 1 is a perspective view of a technique simulator according to a first embodiment.

As illustrated in FIG. 1, a technique simulator 10A according to a first embodiment in the present embodiments is provided with a flow path 12 containing a liquid L that imitates blood, a pump 13 serving as one example of the liquid flow generation member that generates flow of the liquid L, a catheter insertion port 14 configured so as to interpose a catheter into the flow path 12, and a water tank 16 serving as one example of a container that stores the liquid L therein. As for the liquid L, at least one liquid selected from water, glycerin, mannitol, and lower alcohol is used alone or in combination. A contrast medium, a coloration pigment, an antiseptic, an antimicrobial agent, and the like may be added to the liquid L, as appropriate.

The flow path 12 includes a tissue model 20 that imitates blood vessels of a biological tissue. The tissue model 20 can also be regarded as a vascular model. The tissue model 20 may include a lumen that imitates a blood vessel in a hard resin block. The tissue model 20 includes a bifurcated portion 22 that is provided downstream of the catheter insertion port 14 and is to be bifurcated into at least two flow paths, and a first bifurcated flow path 24 and a second bifurcated flow path 26 provided downstream of the bifurcated portion 22. The first bifurcated flow path 24 and the second bifurcated flow path 26 are provided in the same horizontal plane. Accordingly, the first bifurcated flow path 24 and the second bifurcated flow path 26 are provided at the same height.

The first bifurcated flow path 24 communicates with a first end 28. The second bifurcated flow path 26 communicates with a second end 30. The mutually different pressures are respectively applied to the first end 28 and the second end 30, and both of the pressures are lower than the pressure that is generated by the liquid flow generation member (the pump 13). The first bifurcated flow path 24 and the second bifurcated flow path 26 respectively represent tissues. Between these, the first bifurcated flow path 24 represents a normal liver tissue, and the second bifurcated flow path 26 represents a liver tissue in which cancer cells are propagated.

The first end 28 that communicates with the first bifurcated flow path 24 forms a first discharge port 28a. The liquid L is discharged from the first discharge port 28a in the downstream of the first bifurcated flow path 24 and at a position higher than a water surface of the water tank 16, to the water tank 16. The first discharge port 28a is an opening portion that is open to the outside air. Therefore, the first bifurcated flow path 24 is in a state in which a pressure other than the atmospheric pressure is not substantially applied thereto from the downstream side (from the side of the first discharge port 28a).

The second end 30 that communicates with the second bifurcated flow path 26 forms a second discharge port 30a. The second discharge port 30a is coupled to the vicinity of a bottom of the water tank 16, in the downstream of the second bifurcated flow path 26. The second discharge port 30a may be provided at a position lower than a liquid surface of the liquid L stored in the water tank 16. The liquid surface of the liquid L in the water tank 16 is set at a position lower than the tissue model 20 (a flow path formation block 32, which is described later). With the principle of the siphon, a force to cause the liquid L to flow down to the water tank 16 acts in the downstream side of the second bifurcated flow path 26. Therefore, the downstream side of the second bifurcated flow path 26 is in a state in which the pressure is continuously applied toward the downstream side. The height at which the second discharge port 30a is provided is not limited to the bottom of the water tank 16, but may be a position lower than the tissue model 20. The second discharge port 30a may be provided at a low position on a side surface of the water tank 16.

The first bifurcated flow path 24 includes a plurality of first small-diameter bifurcated flow paths 24a each having an inside diameter smaller than that of other points in the first bifurcated flow path 24. The second bifurcated flow path 26 includes a plurality of second small-diameter bifurcated flow paths 26a each having an inside diameter smaller than that of other points in the second bifurcated flow path 26. The first bifurcated flow path 24 and the second bifurcated flow path 26 are respectively flow paths that imitate microvessels. The first bifurcated flow path 24 and the second bifurcated flow path 26 respectively further include a plurality of bifurcated flow paths 24b and a plurality of bifurcated flow paths 26b each having a smaller inside diameter. In other words, in the first bifurcated flow path 24 and the second bifurcated flow path 26, every time each flow path is bifurcated, the inside diameter of the flow path becomes smaller.

The entire flow path 12 is formed of a transparent material such that the internal flow of the liquid L can be visually observed. In the first embodiment, the tissue model 20 (the bifurcated portion 22, the first bifurcated flow path 24, the second bifurcated flow path 26, the first small-diameter bifurcated flow paths 24a, the second small-diameter bifurcated flow paths 26a, and vicinity points thereof) that forms a part of the flow path 12 is formed of holes (cavities) made in the flow path formation block 32 that is made of a transparent material such as silicon. The other parts in the flow path 12 are formed of a plurality of tubes.

The flow path formation block 32 is horizontally installed on a support mount 33. In the first embodiment, the flow path formation block 32 is formed in a panel shape and is formed in a quadrilateral shape in a top view. The flow path formation block 32 holds at least the first bifurcated flow path 24 and the second bifurcated flow path 26 in a plane. Note that, the shape of the flow path formation block 32 is not limited to a quadrilateral shape, but may be formed in a circular shape or another polygonal shape in a plan view. The flow path formation block 32 is not necessarily in a panel shape.

Specifically, in the flow path 12, tubes 34, 36, 38, and 40 are respectively formed between the water tank 16 and the pump 13, between the pump 13 and the flow path formation block 32, between the flow path formation block 32 and the first discharge port 28a, and between the flow path formation block 32 and the second discharge port 30a.

Note that, in the flow path 12, the flow path formation block 32 is not used, but the tissue model 20 may include tubes. In this case, the tissue model 20 including a plurality of tubes may be fixed to a support member (for example, a support plate) to easily maintain the shape thereof. In the first embodiment, the flow path is bifurcated into the two flow paths at the bifurcated portion 22, however, may be bifurcated into three or more flow paths.

The pump 13 pumps up the liquid L being put in the water tank 16 through the tube 34, and generates a liquid flow flowing from a side of the water tank 16 toward a side of the tissue model 20, in the flow path 12. The liquid L is delivered through the tube 36 to the tissue model 20 formed in the flow path formation block 32. The tube 36 is coupled to one side surface 32a of the flow path formation block 32 having a quadrilateral shape. The tubes 38 and 40 are coupled to a side surface 32b at an opposite side of the one side surface 32a of the flow path formation block 32. An outlet of the tube 38 forms the first end 28 (the first discharge port 28a). An outlet of the tube 40 forms the second end 30 (the second discharge port 30a). When the height from a plane on which the technique simulator 10A is installed is compared, the second discharge port 30a is positioned lower than the first discharge port 28a. The tube 40 can be regarded as a pressure difference generation member that causes a pressure difference to generate between the downstream side of the first bifurcated flow path 24 and the downstream side of the second bifurcated flow path 26.

In the first embodiment, the pump 13 delivers the liquid L at a pressure higher than an atmospheric pressure that is applied to the first discharge port 28a and a water pressure that is applied to the second discharge port 30a. The form of the pump 13 is not specially limited, and can include a centrifugal pump, for example. Note that, the pump 13 may be installed in the water tank 16. The liquid flow generation member applicable to the present embodiment is not limited to the pump 13, but may be one that simply generates a liquid flow in one direction in the flow path 12. For example, a liquid flow may be caused to generate in the flow path 12 in such a manner that a bag in which the liquid L is contained is coupled to the flow path 12 through a tube and is installed at a position higher than the tissue model 20 to cause the liquid L to flow due to the drop.

The catheter insertion port 14 for interposing a catheter into the flow path 12 is provided upstream of the bifurcated portion 22. The catheter insertion port 14 simulates an insertion port from which a catheter is inserted into a blood vessel. As for the catheter insertion port 14, a valve, which is not illustrated, that allows the catheter to be inserted but prevents the liquid L in the flow path 12 from leaking is provided in the catheter insertion port 14.

Note that, it is possible to change the pressure by installing a flow rate adjustment device, such as a valve, a clamp, or a cock, to at least one of the tubes 34, 36, 38, and 40, and adjusting the flow rate by the flow rate adjustment device. In addition, it is also possible to automatically control the flow rate by replacing the valve or the like with a variable type electromagnetic valve or the like, and setting various conditions by using a PC and a dedicated control apparatus.

Figure 2:
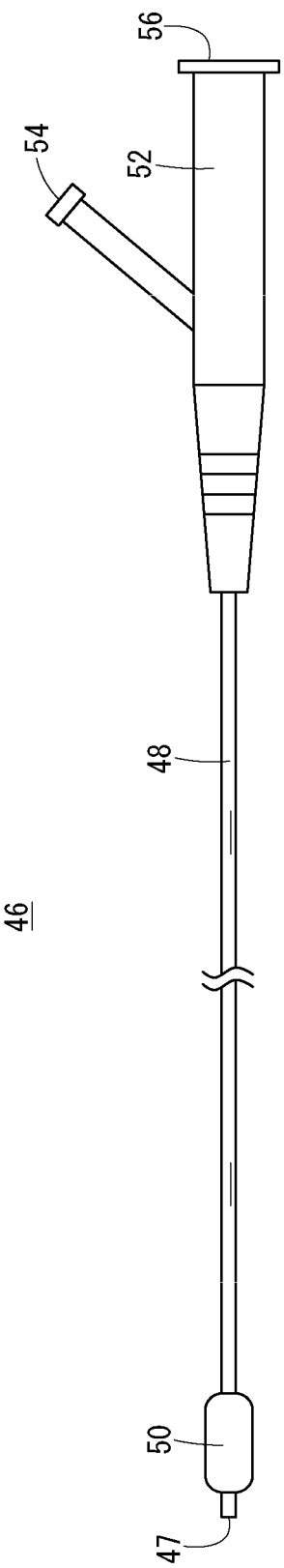
FIG. 2 is a configuration explanation view of a balloon catheter.

As illustrated in FIG. 2, a catheter 46 (balloon catheter) for using the technique simulator 10A is provided with a catheter main body 48, a balloon 50 that is provided to a distal end portion of the catheter main body 48 and can inflate and deflate, and a hub 52 that is coupled to a proximal portion of the catheter main body 48. The interior of the balloon 50 communicates with an inflation port 54 provided to the hub 52 via an inflation lumen provided to the catheter main body 48. An inflation liquid is injected from the inflation port 54, whereby the balloon 50 inflates. FIG. 2 illustrates the balloon 50 in an inflated state. Note that, the inflation liquid is injected using a syringe or the like, which is not illustrated.

The hub 52 includes an injection port 56 from which a therapeutic agent is injected into a blood vessel of a tissue serving as a target. The injection port 56 communicates with a terminal opening 47 of the catheter 46 via an injection lumen provided in the interior of in the catheter main body 48. The therapeutic agent injected from the injection port 56 is administered into the blood vessel from the terminal opening 47. Note that, the injection lumen also functions as a guide wire lumen.

Next, an effect of the technique simulator 10A configured as the above will be described.

Figure 3:
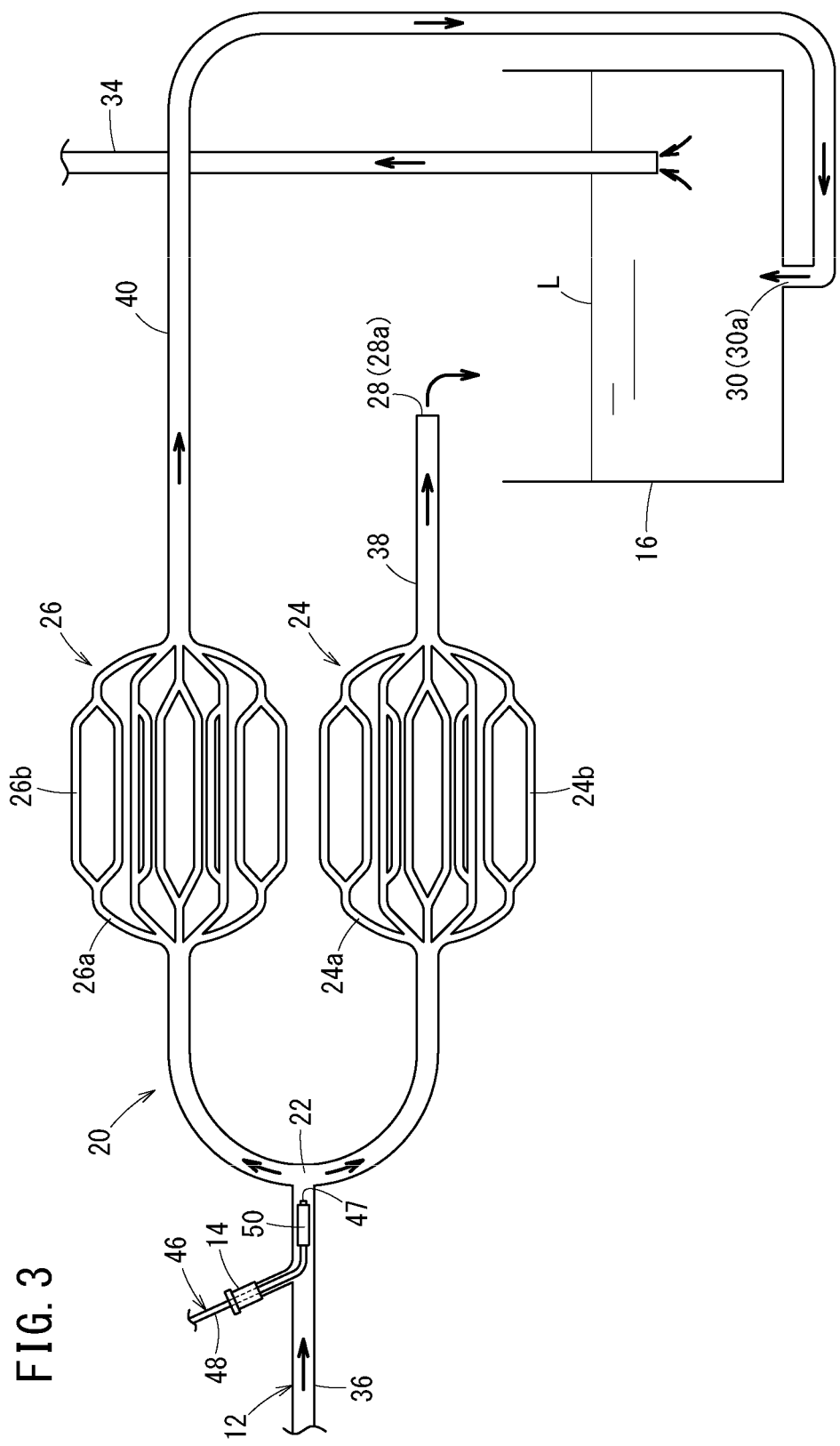
FIG. 3 is a first effect explanation view of the technique simulator according to the first embodiment.

As illustrated in FIG. 3, a user can insert the catheter 46 into the flow path 12 via the catheter insertion port 14, and visually identify a behavior of a simulated therapeutic agent when the simulated therapeutic agent is administered from the terminal opening 47 in a state in which the balloon 50 does not inflate. The user administers (injects) a colored liquid L' (hereinafter, referred to as colored water) as a simulated therapeutic agent. In the state in which the balloon 50 does not inflate, the colored water administered into the flow path 12 flows to the downstream side with the liquid L that is delivered by the pump 13. At this time, in the bifurcated portion 22, the liquid L and the colored water flow to both of the first bifurcated flow path 24 and the second bifurcated flow path 26. This is because the flow pressure that is sent by the pump 13 (FIG. 1) is higher than the pressures in the downstream sides of both of the first bifurcated flow path 24 and the second bifurcated flow path 26. A drop between a liquid surface, which is described later, of the liquid L and the tissue model 20 is not large, so that no remarkable negative pressure generates, in other words, the flow of the pump equal to or more than the pressure difference is adjusted so as to be established. Moreover, the liquid L is preferably transparent in order to recognize a difference due to the movement of the colored water. Note that, a solid embolization material may be added to the colored water. As for the solid embolization material, gelatin, spherical plastic, a fluorescent piece are suitably used.

Figure 4:
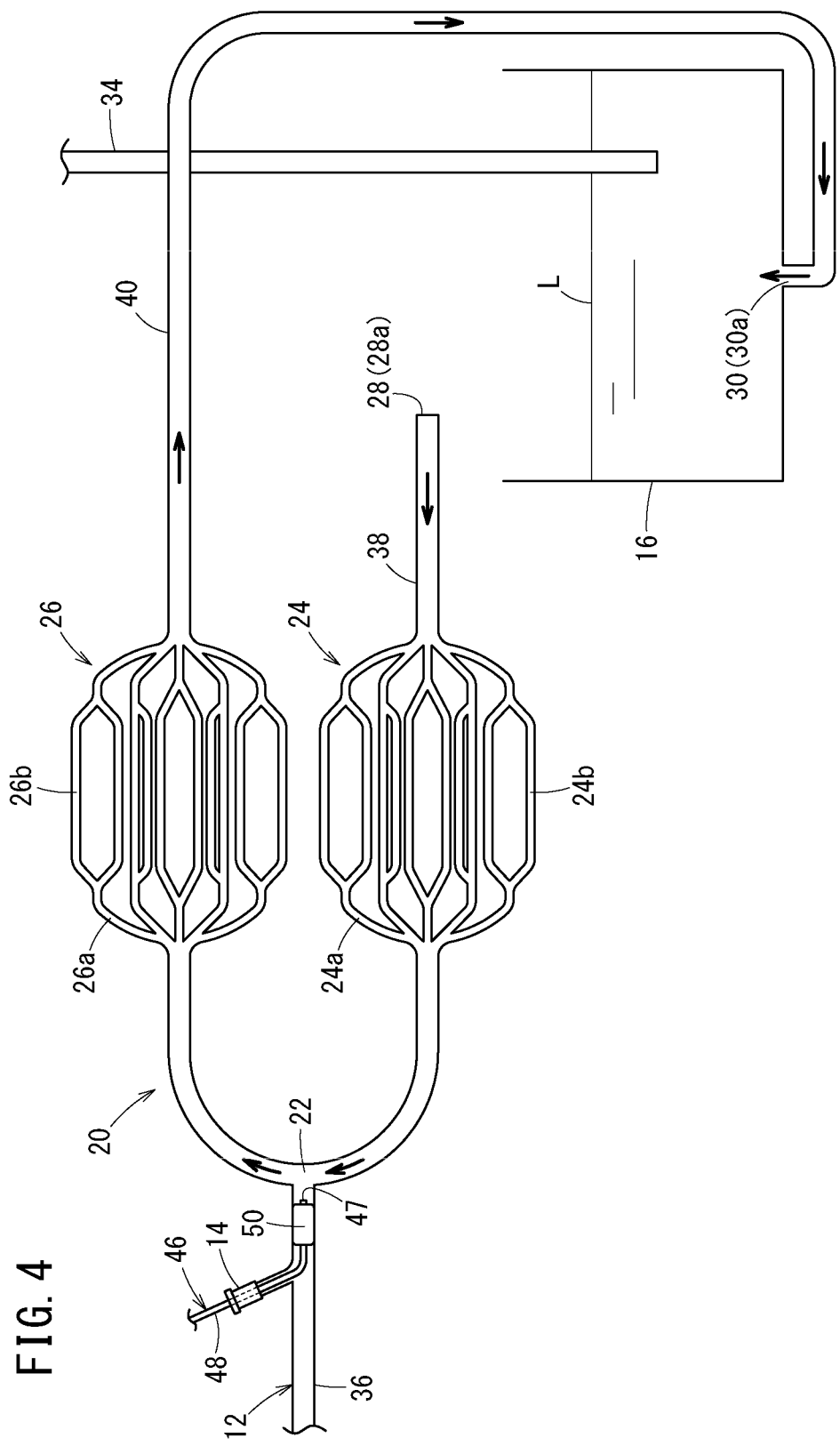
FIG. 4 is a second effect explanation view of the technique simulator according to the first embodiment.

Next, as illustrated in FIG. 4, the user can visually identify the behavior of the simulated therapeutic agent in a case where the balloon 50 is inflated to occlude the flow path 12 at the upstream side from the bifurcated portion 22. In a state in which the balloon 50 is inflated, the colored water is administered from the terminal opening 47 of the catheter main body 48. The colored water receives no pressure by the pump 13 because the flow path at the upstream side is occluded by the balloon 50. Therefore, the colored water to which only the pressure when the colored water is injected is applied is caused to flow to the downstream side.

Figure 6:
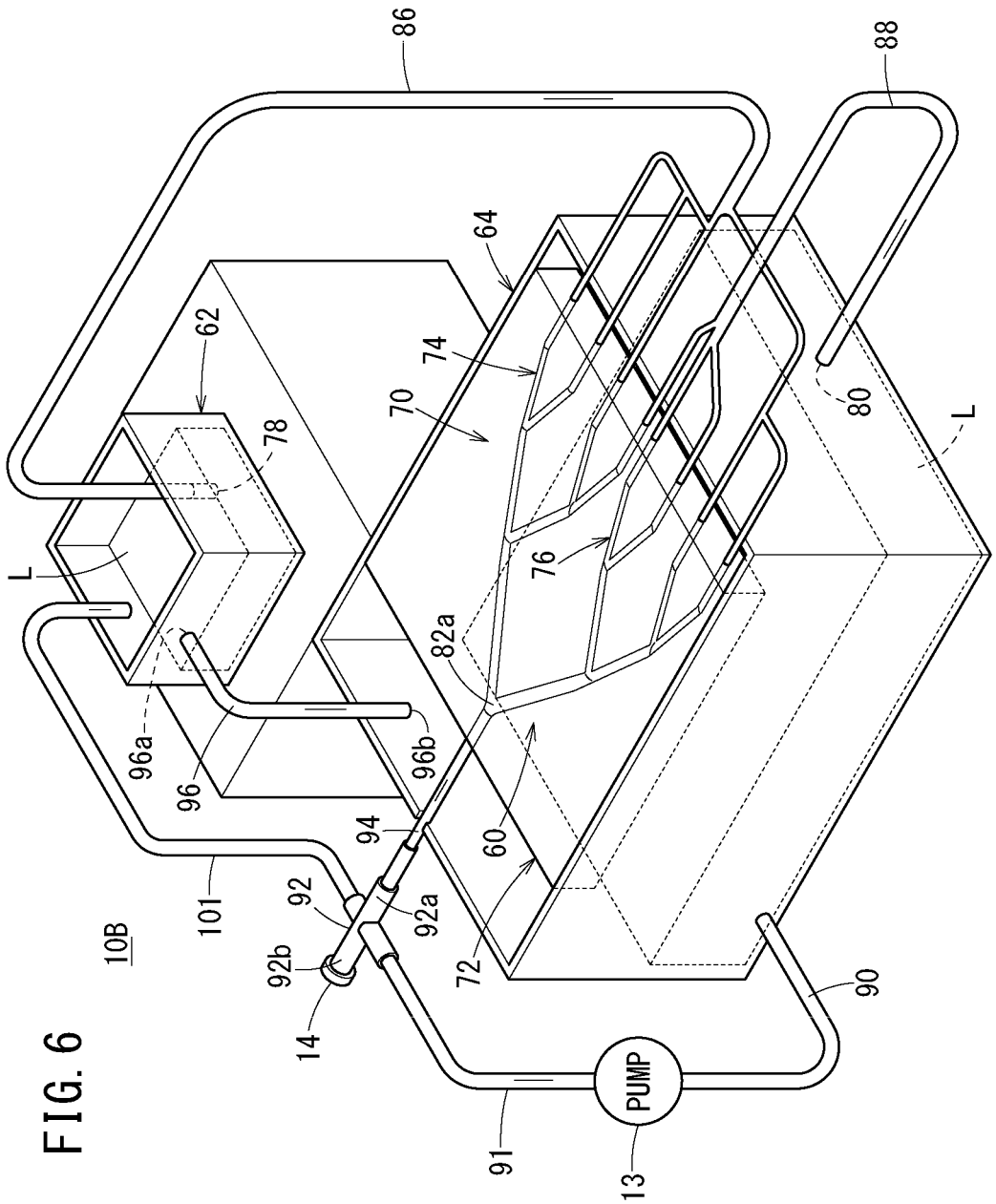
FIG. 6 is a perspective view of a technique simulator according to a second embodiment.

At this time, when the user injects the colored water in small amounts at a very weak pressure so as to provide no change to the flow (blood flow) of the liquid L, such a phenomenon occurs that the liquid L flowed backward from a side of the first discharge port 28a is flowed to the side of the second bifurcated flow path 26 and the second discharge port 30a through the bifurcated portion 22. Such a phenomenon occurs that the colored water administered at a faint pressure moves along with the flow of the liquid L from the side of the first discharge port 28a to the side of the second discharge port 30a, and selectively flows to only the side of the second bifurcated flow path 26, without flowing to the side of the first bifurcated flow path 24. This is because a pressure value is not zero in the flow path downstream of the occluded position of the balloon 50 because a negative pressure due to the flow from the second bifurcated flow path 26 into the second discharge port 30*a* is applied thereto at this time, and the pressure at the side of the first discharge port 28*a*, which is the atmospheric pressure, is relatively higher than that at the side of the second discharge port 30*a*. In a case where the user injects the colored water at the pressure higher than the atmospheric pressure, the phenomenon that the colored water selectively flows only to the side of the second bifurcated flow path 26 does not occur. FIG. 6, which is described later, illustrates a configuration that allows a continuous flow to generate with respect to a backflow from the first discharge port 28*a* in FIG. 3, and a flow from the flow path 12 in FIG. 2 to be maintained.

Therefore, the user of the technique simulator 10A can suitably conduct the understanding and the learning of training of a balloon-occluded technique including a B-TACE technique in which the balloon 50 is inflated upstream of the blood vessel bifurcated portion, and a therapeutic agent is administered in a state in which the blood vessel is occluded. The user can learn training of confirming that a pressure difference occurs at the upstream side of a target site, and training of selectively administering a therapeutic agent to the target site at a pressure lower than that of the surrounding tissue. In addition, the user can learn a method of slowly administering a drug at a weak pressure, which is required for the B-TACE technique, and thus can acquire a treatment technique different from that for the conventional contrast medium and the therapeutic agent to be injected by one shot. Moreover, the technique simulator 10A can be used, in a case where a blood flow-occluding effect technique using a balloon is used, as a state in which another blood flows in, a technique explanation and a simulation model of a portion having a pressure difference in the tissue, other than the B-TACE technique.

The technique simulator 10A is provided with the flow path formation block 32 in which the first bifurcated flow path 24 and the second bifurcated flow path 26 are formed. This configuration allows the shapes and the heights of the first bifurcated flow path 24 and the second bifurcated flow path 26, which imitate biological tissues, to be stably set to a desired state.

The second end 30 is disposed at a position lower than the first bifurcated flow path 24 and the second bifurcated flow path 26. Accordingly, when the first bifurcated flow path 24 and the second bifurcated flow path 26 are filled with the liquid, a pressure (negative pressure) toward the water tank 16 is applied to the second end 30 based on the principle of the siphon. Therefore, it is possible to generate a pressure difference between the first bifurcated flow path 24 and the second bifurcated flow path 26 with the simple configuration.

The pump 13 is used as the liquid flow generation member, so that it is possible to easily and reliably generate flow of the liquid in the flow path 12 at a desired pressure. Moreover, the liquid L in the water tank 16 is caused to circulate in the flow path 12 to allow training in a long period of time to be conducted.

Figure 5:
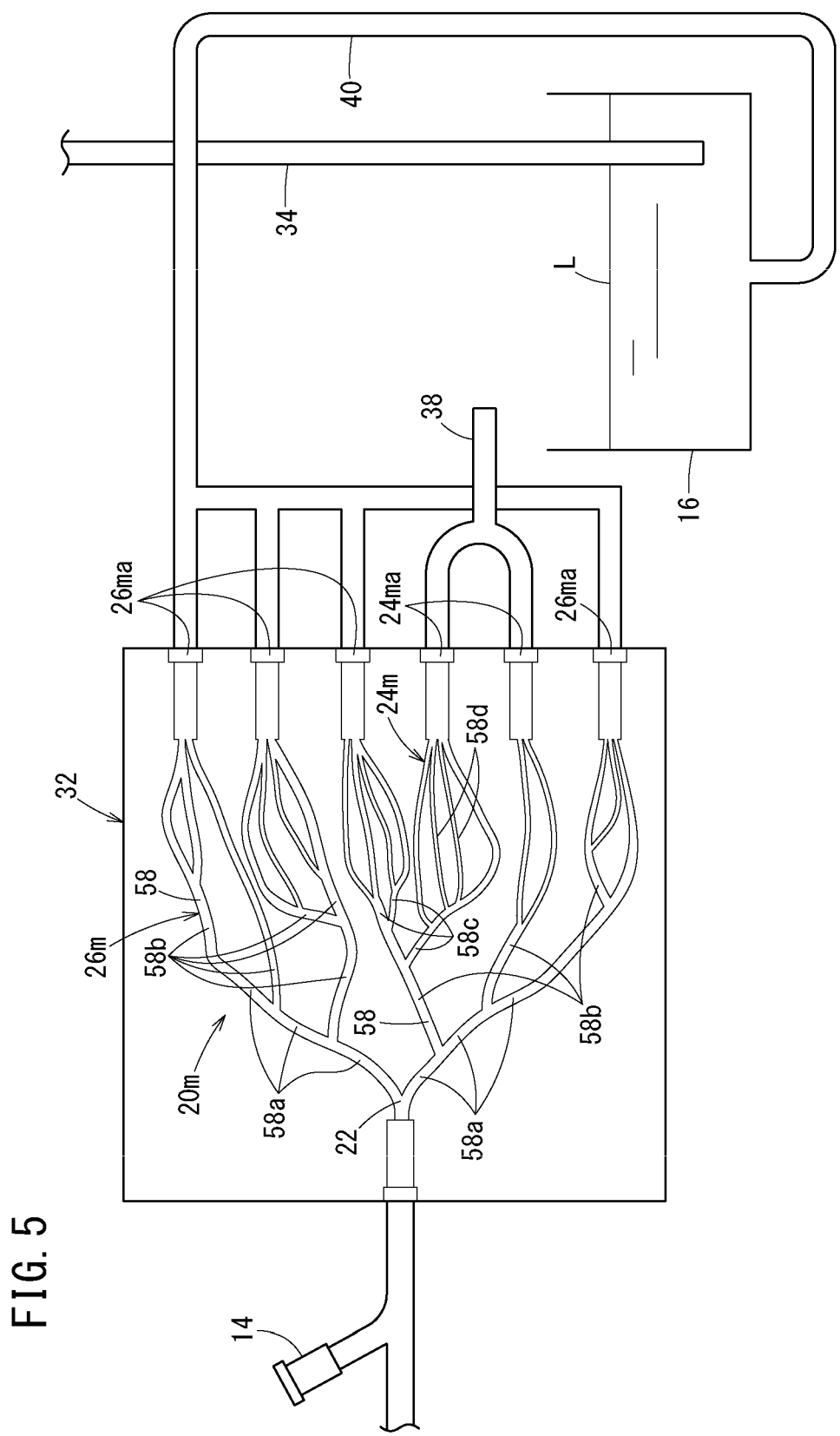
FIG. 5 is a configuration explanation view of a tissue model according to a modification example.

In the technique simulator 10A illustrated in FIG. 1, the tissue model 20 in which the first bifurcated flow path 24 and the second bifurcated flow path 26 respectively include a single downstream side connection port 25 and a single downstream side connection port 27 is used, however, in place of such the tissue model 20, a tissue model 20*m* illustrated in FIG. 5 may be used. The tissue model 20*m* has more complicated bifurcation of a flow path than the tissue model 20 illustrated in FIG. 1 and the like, and has a structure closer to a liver tissue of a human.

As illustrated in FIG. 5, a first bifurcated flow path 24*m* and a second bifurcated flow path 26*m* of the tissue model 20*m* respectively include a plurality of downstream side connection ports 24*ma* and a plurality of downstream side connection ports 26*ma*. Specifically, the first bifurcated flow path 24*m* includes the two downstream side connection ports 24*ma*. For example, the second bifurcated flow path 26*m* includes the four downstream side connection ports 26*ma*. Similar to the tissue model 20 illustrated in FIG. 1 and the like, also in the tissue model 20*m*, the first bifurcated flow path 24*m* and the second bifurcated flow path 26*m* respectively include a plurality of small-diameter flow paths 58 (58*b* to 58*d*). As one example, the diameter of the flow path 58*a* is 2.5 mm, the diameter of the narrower flow path 58*b* is 2 mm, the diameter of the further narrower flow path 58*c* is 1.5 mm, and the diameter of the narrowest flow path 58*d* is 1 mm.

The use of the tissue model 20*m* in the technique simulator 10A allows the user of the technique simulator 10A to conduct training with more reality.

As illustrated in FIG. 6, a technique simulator 10B according to a second embodiment in the present embodiments is provided with a flow path 60 including the liquid L that imitates blood, the pump 13 serving as one example of the liquid flow generation member that generates flow of the liquid L, the catheter insertion port 14 that causes a catheter to interpose into the flow path 60, a first water tank 62 serving as one example of the first container that stores the liquid L therein, and a second water tank 64 serving as one example of the second container that stores the liquid L therein. In other words, the first discharge port 28*a* in FIG. 1 is coupled to the first water tank 62 in FIG. 6, and the water tank 16 in FIG. 1 is placed as the second water tank 64 in FIG. 6.

The entire flow path 60 is formed of a transparent material such that the internal flow of the liquid L can be visually observed. The flow path 60 communicates with a tissue model 70 (blood vessel model) that imitates blood vessels of a biological tissue. The tissue model 70 includes a flow path formation block 72 made of a transparent material such as silicon, and a lumen that is provided in the flow path formation block 72 and leads from one end to the other end of the flow path formation block 72. The flow path formation block 72 is installed to an upper portion (above a liquid surface of the liquid L in the second water tank 64) of the second water tank 64. The first water tank 62 is installed so as to include a liquid surface above a top face of the flow path formation block 72.

The tissue model 70 includes, as a plurality of bifurcated flow paths, a first bifurcated flow path 74 and a second bifurcated flow path 76. The first bifurcated flow path 74 communicates with a first end 78. The second bifurcated flow path 76 communicates with a second end 80. The second bifurcated flow path 76 may be at a position lower than the tissue model 70. The mutually different pressures are respectively applied to the first end 78 and the second end 80, and are lower than the pressure that is generated by the liquid flow generation member (the pump 13). The first bifurcated flow path 74 and the second bifurcated flow path 76 respectively represent liver tissues. Between these, the first bifurcated flow path 74 represents a normal liver tissue, and the second bifurcated flow path 76 represents a liver tissue in which cancer cells are propagated.

Figure 7:
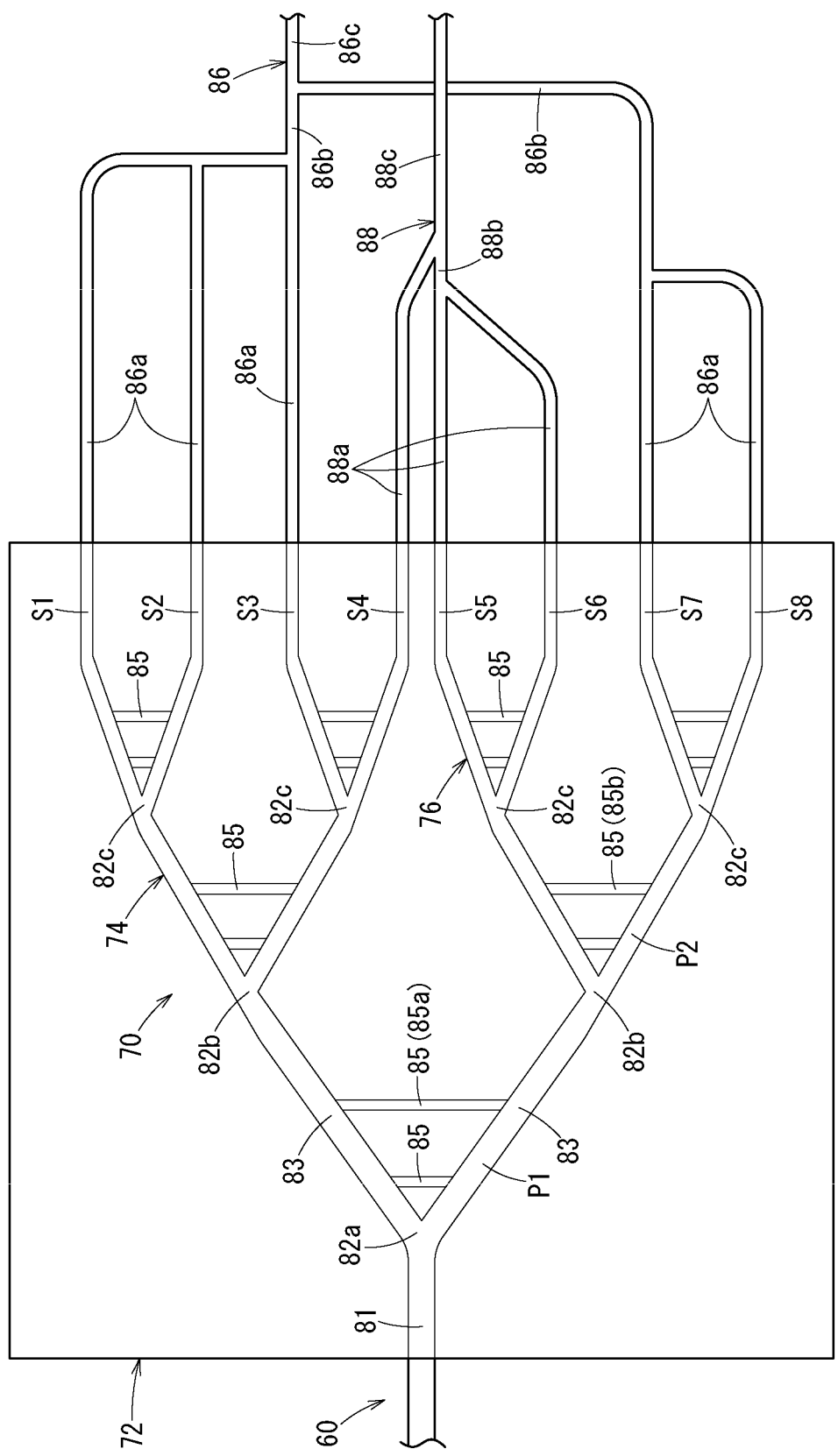
FIG. 7 is a configuration explanation view of a tissue model of the technique simulator according to the second embodiment.

As illustrated in FIG. 7, in the tissue model 70, a main flow path 81 is bifurcated into two flow paths 83 at a bifurcated portion 82*a*, each of which is further bifurcated twice at bifurcated portions 82*b* and 82*c* provided in the downstream: eventually, is bifurcated into eight flow paths S1 to S8 in total, which are assumed as a site of a liver of human. Each of the bifurcated portions 82a to 82c is bifurcated into two flow paths in the second embodiment, but may be bifurcated into a plural flow paths of an arbitrary number.

In the downstream of each of the bifurcated portions 82a to 82c, a plurality (two in the present embodiment) of interlock flow paths 85 that connect the bifurcated flow paths to each other are provided. Each interlock flow path 85 imitates a collateral blood flow of tissue. The diameter (inside diameter) of each flow path in the tissue model 70 is designed so as to be narrower than that of the original (before the bifurcation) flow path for every time each flow path is bifurcated. The diameter thereof after the bifurcation is preferably designed so as to be 70 to 90% of the diameter before the bifurcation. The present embodiment is designed such that the diameter after the bifurcation is about 80% (78 to 82%) of the diameter before the bifurcation in order for the tissue model 70 to be closer to a liver tissue of human. The length and the diameter of each flow path in the second embodiment are illustrated in a table 1 of FIG. 10.

As illustrated in FIG. 7, the flow paths S1 to S3, S7, and S8 are merged with one another through a tube 86 coupled to the flow path formation block 72 in the downstream to become a single flow path. In other words, the tube 86 includes a plurality of connection flow paths 86a coupled to the flow paths S1 to S3, S7, and S8, and one merged path 86c connected to the plurality of the connection flow paths 86a via a merging part 86b. Similarly, the flow paths S4 to S6 are merged with one another through a tube 88 coupled to the flow path formation block 72 in the downstream to become a single flow path. In other words, the tube 88 includes a plurality of connection flow paths 88a coupled to the flow paths S4 to S6, and one merged path 88c connected to the plurality of the connection flow paths 88a via a merging part 88b. The first bifurcated flow path 74 that represents a normal liver tissue includes the flow paths S1 to S3, S7, and S8. The second bifurcated flow path 76 that represents a liver tissue in which cancer cells are propagated includes the flow paths S4 to S6.

In FIG. 6, the pump 13 pumps up the liquid L being put in the second water tank 64, and generates a liquid flow flowing from a side of the second water tank 64 toward the tissue model 70, in the flow path 60. Specifically, the pump 13 pumps up the liquid L from the second water tank 64 through a tube 90 coupled to the second water tank 64, and delivers the liquid L to a T-shaped tube 92 through a tube 91. One end 92a of the T-shaped tube 92 is coupled to a tube 94 coupled to the flow path formation block 72. The catheter insertion port 14 is provided to the other end 92b of the T-shaped tube 92. The liquid L pumped up by the pump 13 is delivered to the tissue model 70 through the T-shaped tube 92.

The first water tank 62 and the second water tank 64 respectively store the liquid L therein, and have liquid surfaces the heights of which are different from each other. Specifically, the liquid surface of the liquid L in the first water tank 62 is positioned higher than the liquid surface of the liquid L in the second water tank 64 and the tissue model 70 (the flow path formation block 72).

The other end of the tube 86 having one end coupled to the first bifurcated flow path 74 forms the first end 78, and communicates with an inside of a storage tank of the first water tank 62 and is coupled thereto at a position lower than the liquid surface of the liquid L in the first water tank 62. In the second embodiment, the other end of the tube 86 (the first end 78) is disposed in a form of being submerged in the liquid L in the first water tank 62, however, in place of such a configuration, the other end of the tube 86 may be coupled to a wall of the first water tank 62 to communicate with the storage tank of the first water tank 62.

One end (an inlet 96a) of a tube 96 serving as one example of the discharge flow path is coupled to the first water tank 62 at a position higher than the first end 78. The other end (outlet 96b) of the tube 96 is provided at a position lower than one end of the tube 96 and higher than the liquid surface of the liquid L in the second water tank 64. The liquid L flows into the first water tank 62 through the tube 86, and when the liquid surface of the liquid L in the first water tank 62 reaches the height of the inlet 96a of the tube 96, the liquid L is discharged into the second water tank 64 through the tube 96. Accordingly, the height of the liquid surface of the liquid L in the first water tank 62 is kept constant at the height of the inlet 96a of the tube 96, which suppresses the liquid L from overflowing from the first water tank 62 during training. The tube 96 has a diameter that allows the liquid L to be sufficiently discharged, relative to the sum of the inflow amount of the liquid L from the tube 86 and the inflow amount of the liquid L from a tube 101. This allows the liquid surface of the first water tank 62 to be kept constant, and the pressure (back flow) that is applied to the first bifurcated flow path 74 (which is simulated as a normal liver tissue) through the tube 86 to be made constant over a long period of time.

The other end of the tube 88 having one end coupled to the second bifurcated flow path 76 forms the second end 80, and communicates with an inside of a storage tank of the second water tank 64 and is coupled thereto at a position lower than the liquid surface of the liquid L in the second water tank 64. The tube 88 can be regarded as the pressure difference generation member that causes a pressure difference to generate between the downstream side of the first bifurcated flow path 74 and the downstream side of the second bifurcated flow path 76. In the second embodiment, the other end (the second end 80) of the tube 88 is coupled to a wall of the second water tank 64 to communicate with the storage tank of the second water tank 64, however, in place of such a configuration, the other end of the tube 88 may be disposed in a form of being submerged in the liquid L in the second water tank 64 (a form of not being coupled to the wall of the second water tank 64).

In FIG. 6, the first end 78 communicated with the first bifurcated flow path 74 and the second end 80 communicated with the second bifurcated flow path 76 have different pressure values. Accordingly, a pressure difference is generated between the first bifurcated flow path 74 and the second bifurcated flow path 76. Specifically, a pressure (positive pressure) in accordance with a level difference between the water level of the liquid L in the first water tank 62 and the tissue model 70 (the flow path formation block 72) is applied to the first bifurcated flow path 74, and a pressure (negative pressure) in accordance with a level difference between the tissue model 70 (the flow path formation block 72) and the second water tank 64 is applied to the second bifurcated flow path 76. Accordingly, between the first bifurcated flow path 74 and the second bifurcated flow path 76, the pressure to be applied to the first bifurcated flow path 74 is relatively higher and the pressure to be applied to the second bifurcated flow path 76 is relatively lower.

Figure 8:
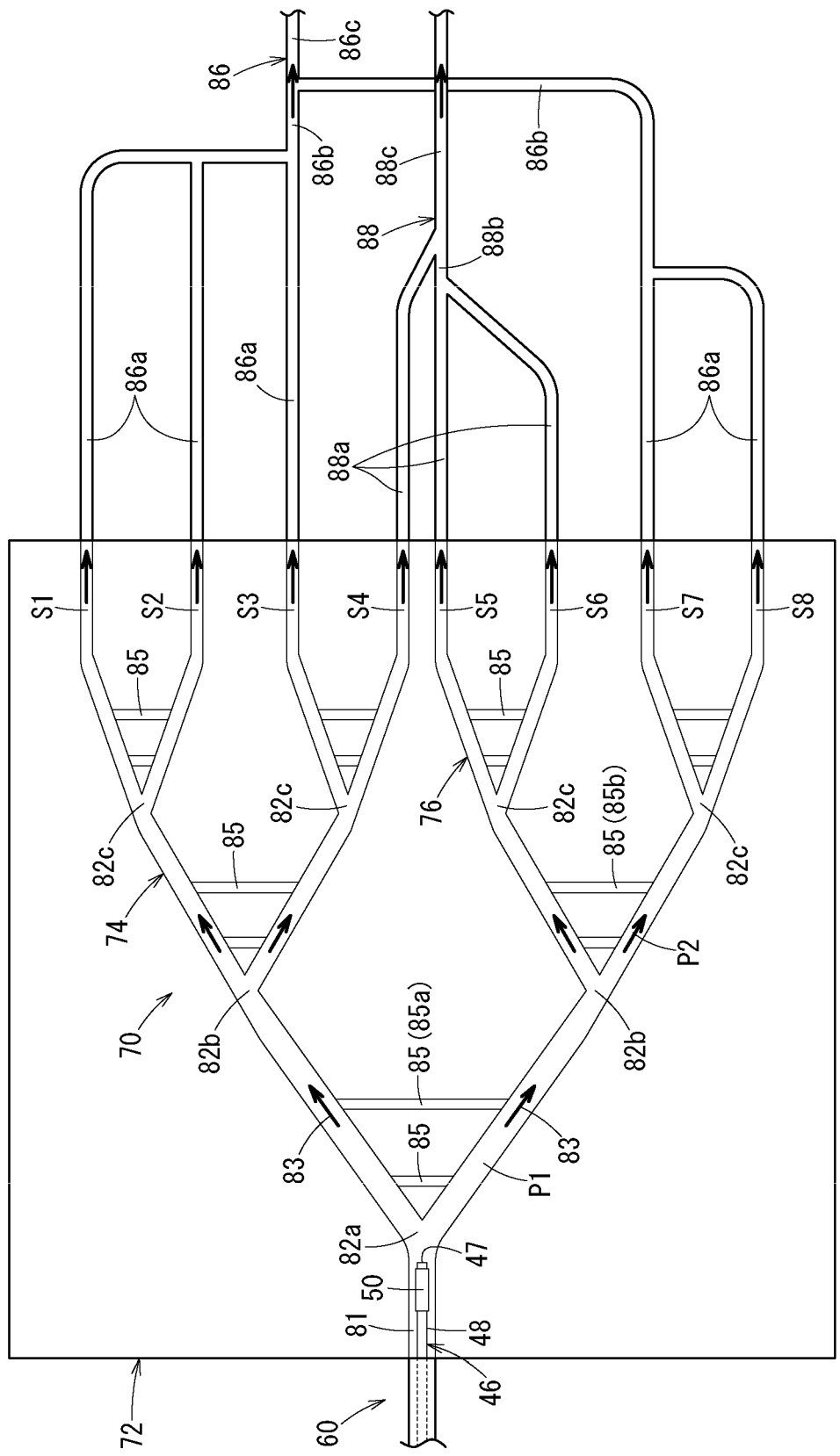
FIG. 8 is a first effect explanation view of the technique simulator according to the second embodiment.

The flow pressure that is generated by the pump 13 is higher than the pressure that is applied to the first end 78 and the second end 80. In other words, the pressure per unit cross-sectional area to be applied to the upstream side of the bifurcated portion 82a is larger than the pressure per unit cross-sectional area in the first end 78. Moreover, the pressure per unit cross-sectional area to be applied to the upstream side of the bifurcated portion 82a is larger than the pressure per unit cross-sectional area in the second end 80. Accordingly, as illustrated in FIG. 8, in a state in which the catheter 46 is inserted from the catheter insertion port 14 into the flow path 60 in which the flow is added to the liquid L by the pump 13, a terminal of the catheter 46 is disposed at the upstream side of the bifurcated portion 82a, and the balloon 50 is not inflated, when a therapeutic agent (colored water) is administered (injected) from the terminal opening 47 of the catheter 46, the therapeutic agent flows to both of the side of the first bifurcated flow path 74 and the side of the second bifurcated flow path 76.

Figure 9:
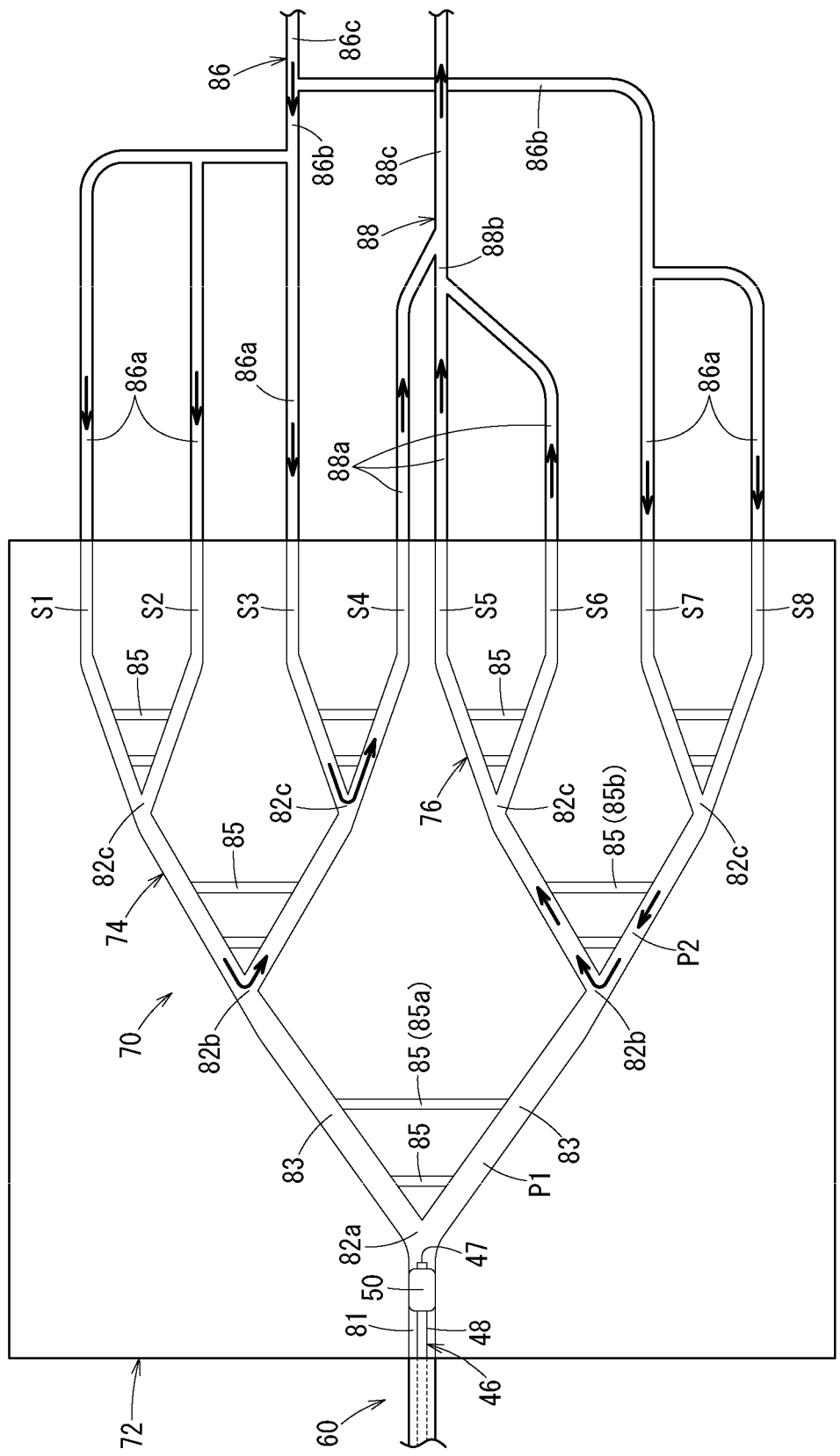
FIG. 9 is a second effect explanation view of the technique simulator according to the second embodiment.

Meanwhile, as illustrated in FIG. 9, in a state in which the balloon 50 is inflated upstream of the bifurcated portion 82a to occlude the flow path, when a colored water that simulates a therapeutic agent is administered from the terminal opening 47 of the catheter 46 at a faint pressure, the abovementioned pressure difference causes such a phenomenon to occur that the liquid L flows from the side of the first bifurcated flow path 74 to the side of the second bifurcated flow path 76 in the tissue model 70. Accordingly, such a phenomenon occurs that the colored water discharged from the terminal opening 47 does not flow to the side of the first bifurcated flow path 74, but flows only to the side of the second bifurcated flow path 76 (the flow paths S4 to S6). In other words, due to a difference in pressure between the ends to which the bifurcated flow paths are coupled, the direction along which the colored water flows in S1 to S3, S7, and S8 when the flow path is embolized by the catheter 46 is opposite to that in FIG. 8 when the flow path is not embolized. In this case, when the liquid surface of the liquid L in the first water tank 62 is the same as or higher by 1 to 5 cm, preferably, about 1 to 3 cm, than a top face of the tissue model 70, the flow velocity at which the flow of the liquid L in the tissue model 70 can be visually identified is obtained.

Accordingly, similar to the first embodiment, when a therapeutic agent is slowly administered in a state in which the balloon 50 is inflated in the upstream of the blood vessel bifurcated portion to occlude the blood vessel, a user of the technique simulator 10B according to the second embodiment can visually confirm that a condition in which a pressure difference can be generated in the downstream side is present. Therefore, when a target site being at a low pressure is confirmed, the user can realize that the selective administration to the target site is possible. Moreover, in a state in which the blood vessel is occluded, when a therapeutic agent is administered at a high pressure, the user can understand that the administration using the pressure difference is impossible at the downstream side occluded by the balloon 50.

Moreover, as illustrated in FIG. 6, the technique simulator 10B is provided with the first water tank 62 and the second water tank 64 that store the liquid L therein, the liquid surface of the liquid L in the first water tank 62 is set to a position higher than the liquid surface of the liquid L in the second water tank 64. The first end 78 communicates with the inside of the storage tank of the first water tank 62, and is disposed at a position lower than the liquid surface of the liquid L in the first water tank 62. The second end 80 communicates with the inside of the storage tank of the second water tank 64, and is disposed at a position lower than the liquid surface of the liquid L in the second water tank 64. The first bifurcated flow path 74 and the second bifurcated flow path 76 are disposed at a height between the liquid surface of the liquid L in the first water tank 62 and the liquid surface of the liquid L in the second water tank 64. With this configuration, when the balloon 50 is inflated in the flow path 60, it is possible to continuously make a flow from the side of the first bifurcated flow path 74 toward the side the second bifurcated flow path 76, without the inflow of the air from the first end 78. In other words, in FIG. 1, when the balloon is inflated, an air can flow in from the first end 28 after a constant or more time has passed, however, an air does not flow in in the configuration of FIG. 6. Moreover, in the technique simulator 10B of FIG. 6, the tube 88 and/or the second water tank 64 can be omitted. In other words, even when the tube 86 is used as a positive pressure generation member relative to the second bifurcated flow path 76, a simulator similar to the technique simulator 10B can be implemented.

The technique simulator 10B is provided with a discharge flow path (the tube 96) that includes the inlet 96a disposed at a position higher than the first end 78, and the liquid L is discharged through the discharge flow path from the first water tank 62 to the second water tank 64. With this configuration, when the balloon 50 is not inserted into the flow path 60 or when the balloon 50 is not inflated in the flow path 60, the liquid L flows from the first bifurcated flow path 74 via the first end 78 into the first water tank 62. At that time, the tube 96 includes a sufficient lumen, so that the liquid L the amount of which exceeds a predetermined amount is discharged through the flow path (the tube 96) to the second water tank 64. This allows the simulation to be continuously conducted. Moreover, the tube 101 is further coupled to the first water tank 62 from the T-shaped tube 92 to allow the liquid L to be supplied to the first water tank 62 when the balloon 50 is inflated. Therefore, it is possible to generate a flow from the first bifurcated flow path 74 to the second bifurcated flow path 76 for a longer time, and conduct training for a long period of time.

As illustrated in FIG. 7, in the second embodiment, the interlock flow paths 85 indicating a function of a plurality of collateral blood flows are included, so that the inflation position of the balloon 50 can be tried not only at a position in the upstream of the bifurcated portion 82a but also at various positions in the downstream thereof. For example, in FIG. 7, in a case where the balloon 50 is disposed at a position P1 slightly upstream relative to an interlock flow path 85a and colored water is administered at a strong pressure (for example, the injection pressure to the same extent to a case where 1 mL of the colored water is injected in several seconds and a case where a contrast medium is injected to conduct angiography) without inflation, the colored water flows to the entire flow paths S5 to S8 downstream of the bifurcated portion 82b, and partially flows also to the side of the flow paths S1 to S4 through the interlock flow path 85a immediately downstream of the position P1.

Moreover, in a case where the balloon 50 is disposed and inflated at the position P1, the flow path is occluded at the position P1, and colored water is slowly administered, the negative pressure from the tube 88 is applied to the interlock flow path 85a immediately downstream of the position P1 through the flow paths S4 to S6 (the second bifurcated flow path 76), so that the colored water selectively flows to the side of the flow paths S4 to S6. Accordingly, the administered colored water does not flow to the flow paths S7 and S8 due to the pressure from the connection flow paths 86a.

In a case where the balloon 50 is disposed and inflated at a position P2, colored water when being injected at a strong pressure flows to S5 to S8, while colored water being injected at a faint pressure more selectively flows only to the side of the flow paths S5 and S6: occurrence of such a phenomenon can be indicated. This is because an interlock flow path 85b is present immediately downstream of the position P2. The user can easily visually identify the presence of the collateral blood flow, and thus can conduct training of selecting a position at which the balloon 50 is caused to inflate and learn a suitable injection pressure. Therefore, the user can learn, for example, a technique of reducing an anticancer agent that reaches a normal tissue of a patient.

In this manner, in the second embodiment, it is possible to confirm the phenomena that occur in the cases where the balloon 50 is disposed and inflated at various positions. Moreover, a therapeutic agent administration technique different from the angiography can be simulated to allow training of effectively administering the therapeutic agent selectively to a target tissue to be conducted. Note that, setting of the combination of the pressure differences among the flow paths S1 to S8 can be freely changed by changing the connection section of the tubes 86 and 88.

Here, as a condition that is near to a phenomenon of an actual blood vessel and generates a change in the blood flow with an ideal pressure difference, in FIG. 6, for example, when the flow pressure by the pump 13 is about 130 mmHg, each pressure at a side of a low-pressure discharge port (the second end 80) that communicates with the second bifurcated flow path 76 is desirably equal to or more than 64 mmHg, and each pressure at a side of a high-pressure discharge port (the first end 78) that communicates with the first bifurcated flow path 74 is desirably lower than 130 mmHg and higher than the pressure at the side of the discharge port (the second end 80) that communicates with the second bifurcated flow path 76.

Figure 11:
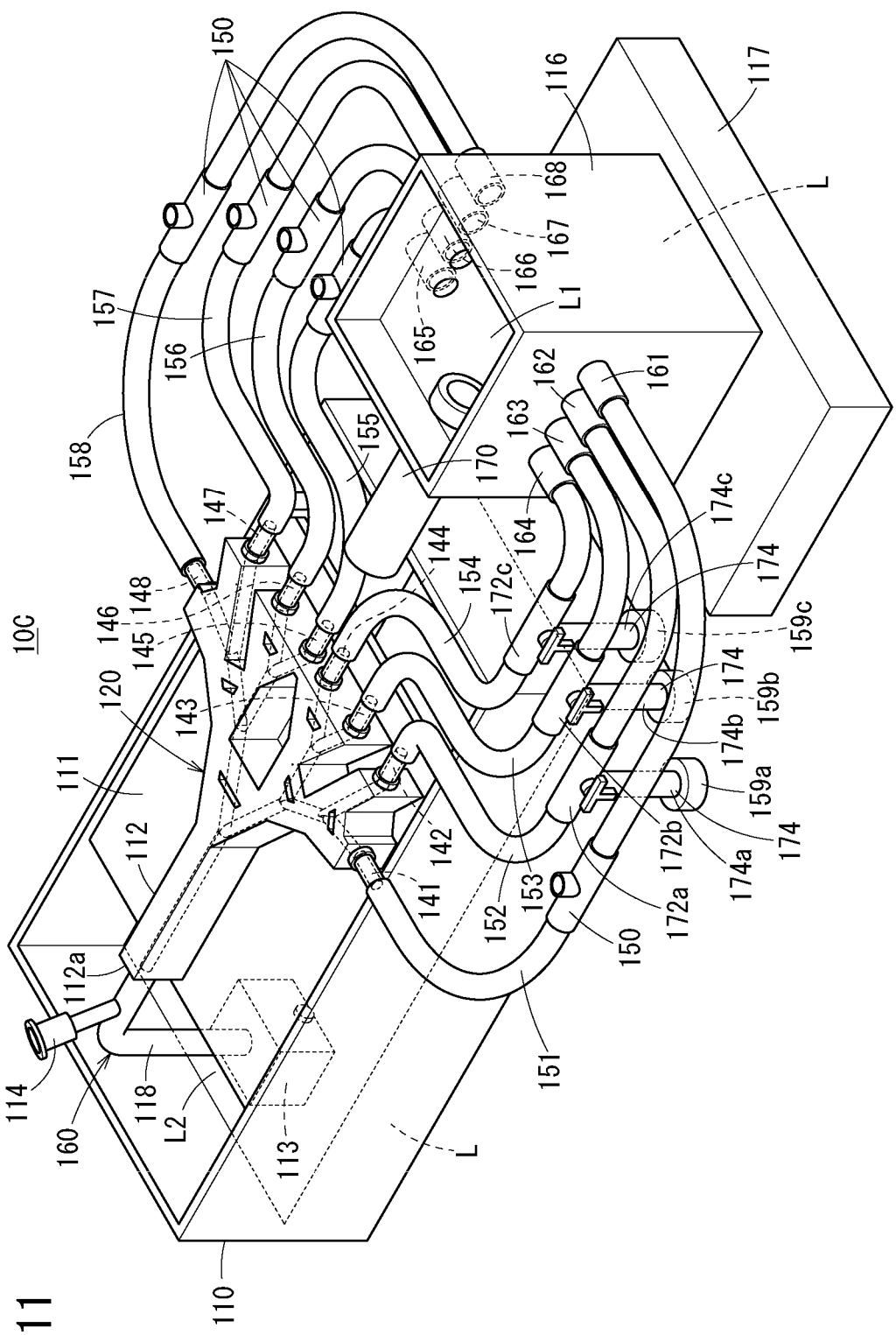
FIG. 11 is a perspective view of a technique simulator according to a third embodiment.

As illustrated in FIG. 11, a technique simulator 10C according to a third embodiment includes a first water tank 116, a second water tank 110, a flow path 160 including the liquid L that imitates blood, and a tissue model 120 (blood vessel model) that imitates blood vessels of a biological tissue. The tissue model 120 is provided to a flow path formation block 112 that is made of a transparent material such as acrylic resin or polycarbonate. The tissue model 120 may include a soft material (rubber material) such as silicon resin. Specifically, the tissue model 120 includes the flow path formation block 112 that is formed in a shape of a tree diagram, and holes (cavities) that are provided in an inside thereof. The flow path formation block 112 is installed on a base 111 provided to an upper portion (above a liquid surface L2 of the liquid L in the second water tank 110) of the second water tank 110.

Figure 13:
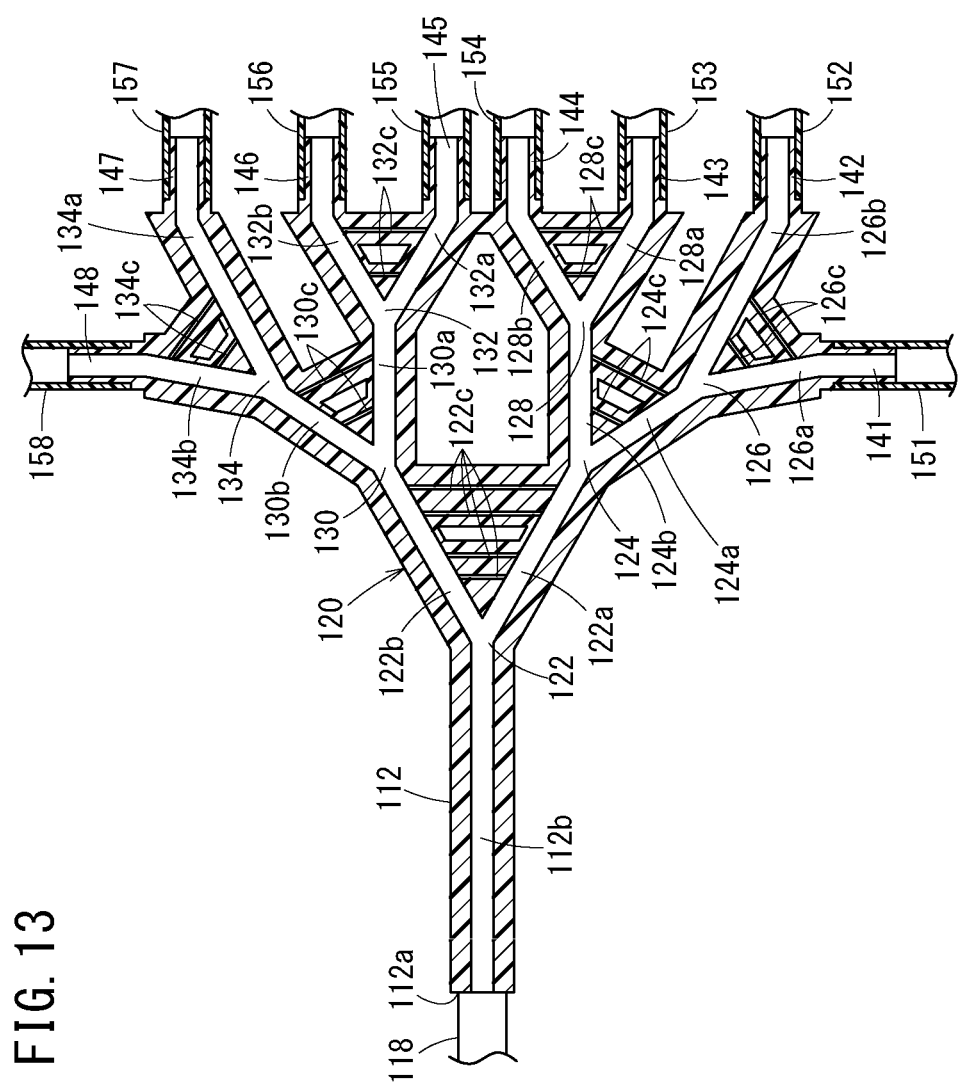
FIG. 13 is a cross-sectional view of a tissue model of the technique simulator according to the third embodiment.

As illustrated in FIG. 13, the tissue model 120 is provided with a plurality of bifurcated flow paths. A bifurcated portion 122 is formed in the closest portion to a side of a starting end portion 112a into which the liquid L flows. Two first bifurcated flow paths 122a and 122b being bifurcated extend from the bifurcated portion 122. The first bifurcated flow paths 122a and 122b being bifurcated at left-right symmetrical angles with respect to a linear part 112b at the upstream side of the bifurcated portion 122 each have an equal length from the bifurcated portion 122 to next bifurcation. The two first bifurcated flow paths 122a and 122b extend so as to form an isosceles triangle or an equilateral triangle using the bifurcated portion 122 and second bifurcated portions 124 and 130 as vertices. The second bifurcated portion 124 is provided to a terminal of the first bifurcated flow path 122a, and second bifurcated flow paths 124a and 124b being further bifurcated extend from the second bifurcated portion 124. Moreover, the second bifurcated portion 130 is provided to a terminal of the first bifurcated flow path 122b, and second bifurcated flow paths 130a and 130b being bifurcated extend from the second bifurcated portion 130.

Third bifurcated portions 126, 128, 132, and 134 are respectively provided to terminal portions of the abovementioned second bifurcated flow paths 124a, 124b, 130a, and 130b. Third bifurcated flow paths 126a, 126b, 128a, 128b, 132a, 132b, 134a, and 134b being bifurcated respectively extend from the third bifurcated portions 126, 128, 132, and 134. In other words, each bifurcated flow path is bifurcated into two at each of the bifurcated portions 122 to 134, and the flow path is bifurcated into the eight third bifurcated flow paths 126a, 126b, 128a, 128b, 132a, 132b, 134a, and 134b through the three-stage bifurcated portions. In the tissue model 120, in a case where a simulated tumor is coupled to any bifurcated flow path, in order that an equivalent condition (flow resistance) can be generated, the respective bifurcated flow paths are formed so as to have an equal length, and are formed on the same plane so as to be left-right symmetrical about a long axis direction of the linear part 112b. The connection angle of each of the bifurcated portions 122 to 134 can be set to 60°, for example. Note that, the number of bifurcated flow paths in the bifurcated portions 122 to 134 is not limited to two, but the flow path may be bifurcated into a plurality of bifurcated flow paths of an arbitrary number.

Moreover, in the downstream of the respective bifurcated portions 122 to 134, a plurality of corresponding interlock flow paths 122c to 134c that connect the bifurcated flow paths to each other are respectively provided. In the illustrated example, two or three of each of the interlock flow paths 122c to 134c are provided relative to each of the bifurcated portions 122 to 134. These interlock flow paths 122c to 134c imitate collateral blood flows of a tissue. In the tissue model 120, the diameter (inside diameter) of each of the bifurcated flow paths 122a to 134b is preferably designed so as to be 70 to 90% of the diameter before the bifurcation for every time the bifurcated flow path is bifurcated. In the present embodiment, the diameter after the bifurcation is set to about 80% (78 to 82%) of the diameter before the bifurcation in order to be closer to a tube tissue of human. The inside diameter of the linear part 112b of the flow path 160 can be set to about 5 mm, for example. In this case, the inside diameter of each of the first bifurcated flow paths 122a and 122b can be set to about 4 mm. Moreover, the inside diameter of each of the second bifurcated flow paths 124a, 124b, 130a, and 130b can be set to about 3.3 mm. In addition, the inside diameter of each of the third bifurcated flow paths 126a, 126b, 128a, 128b, 132a, 132b, 134a, and 134b at the terminal can be set to about 2.8 mm. The inside diameter of each of the interlock flow paths 122c to 134c can be set to about 1.5 to 1.8 mm.

Connection ports 141 to 148 are respectively provided to terminals of the eight third bifurcated flow paths 126a, 126b, 128a, 128b, 132a, 132b, 134a, and 134b in the abovementioned tissue model 120. As illustrated in FIG. 11, pipes 151 to 158 are respectively coupled to the connection ports 141 to 148. The connection ports 141 to 148 are caused to fit into insides of the pipes 151 to 158. All the pipes 151 to 158 are coupled to the first water tank 116. The inside diameter of each of the pipes 151 to 158 can be set to about 2.1 mm, for example. The pipes 151 to 158 may be merged in the halfway to configure a collecting pipe. Note that, three-way stopcocks 172a to 172c (flow path switching units) are provided to at least two pipes among the plurality of the pipes 151 to 158 heading toward the first water tank 116. One end portion of each of tumor simulation pipes 174a to 174c is detachably coupled to the three-way stopcock 172. In the illustrated example, the three-way stopcocks 172a, 172b, and 172c are respectively attached to the three pipes 152, 153, and 154. Moreover, ports 150 are installed to the pipes 151 and 155 to 158 to which no three-way stopcock 172 is attached. Note that, the three-way stopcocks 172 may respectively be provided to all the pipes 151 to 158. In the pipes 151 to 158, the three-way stopcocks 172 may respectively be provided at any positions.

The ports 150 each include a valve into which a tip nozzle of a syringe can be inserted in order to allow bubbles in the pipes 151 and 155 to 158 to be removed in the setup work of the technique simulator 10C. The valve of the port 150 is opened when the tip nozzle of the syringe is inserted thereinto to allow the syringe to suck out bubbles in each of the pipes 151 and 155 to 158. The port 150 is occluded when the tip nozzle of the syringe is pulled out.

The three-way stopcock 172c of the pipe 154 allows the end of the first water tank 116 or the tumor simulation pipe 174c to be selectively communicated with the connection port 144. When the connection port 144 and the tumor simulation pipe 174c are caused to communicate with each other by the three-way stopcock 172c, the liquid L flows out from a filter 159 at an end of the tumor simulation pipe 174c, and does not flow out to the first water tank 116. The three-way stopcocks 172a and 172b respectively provided to the pipes 152 are 153 similarly also cause the connection ports 142 and 143 and the tumor simulation pipes 174a and 174c, respectively or the connection ports 142 and 143 and the first water tank 116, to selectively communicate with each other. Therefore, it is possible to switch the flow path having the simulated tumor (the filter 159) only by the operation of the three-way stopcock 172.

The other end portion of each of the tumor simulation pipes 174a to 174c includes an end 174. The end 174 can be grasped as the pressure difference member by being set at a position lower than a liquid surface L1 of the first water tank 116. Each of the tumor simulation pipes 174a to 174c is configured to allow the liquid L to flow easier by a drop between the tissue model 120 and the end 174 of each of the tumor simulation pipes 174a to 174c than the other pipes in order to represent the simulated tumor. The filter 159 is provided to the end 174 of each of the tumor simulation pipes 174a to 174c. The filter 159 will be described later.

The ends 174 of the tumor simulation pipes 174a to 174c are disposed outward of the second water tank 110 in the example of FIG. 11, however, the present embodiment is not limited thereto, and the tumor simulation pipes 174a to 174c may be routed to the inside of the second water tank 110 and the ends 174 may be disposed in the second water tank 110. In this case, it is possible to recover the liquid L that is discharged from the tumor simulation pipes 174a to 174c into the second water tank 110. Each of the tumor simulation pipes 174a to 174c is at least partially disposed at a position lower than the tissue model 120.

The filter 159 incorporates a filter in a cylindrical transparent house that is made of resin. The filter is a porous member that includes fine pores having a pore diameter of about several micrometers. A film-like member made of polyethersulfone (PES), polyurethane, and the like, a polyethylene sintered compact, and the like can preferably be used. When administration training of a simulated therapeutic agent such as an embolic agent is conducted, the embolic agent can be captured with the filter 159. In addition, the filter 159 is preferably configured to allow the liquid L to pass therethrough, and only capture the embolic agent. With such a configuration, when the embolic agent is injected to gradually embolize the filter 159 and to change the way of flowing of the fluid, thereby generating a backflow and stagnation of the liquid L. In this manner, with the tissue model 120, it is possible to reproduce a state in which a blood vessel that is connected to a tumor cell is embolized, and causes the user to recognize a treatment effect by the injection of the embolic agent.

Note that, the type and the arrangement of the filter 159, and the filter area may be adjusted as appropriate, and the diameter (size) of an embolic substance included in an embolic material may be changed. The sizes and the amounts of the filter 159 and the embolic substance are adjusted to allow the time of occluding to be controlled, and the simulation to be conducted under the various conditions. Moreover, when a simulation embolic substance colored in blue and a white filter are used, it is possible to easily visually identify a state in which the blue simulation embolic substance is accumulated in the white filter. In addition, after the embolic agent has been captured with the filters 159, the tumor simulation pipes 174a to 174c and the filters 159 can be removed from the flow paths and discarded. Therefore, the embolic agent becomes difficult to be mixed into the flow path 160, so that it is possible to continuously conduct the training. By observing not only change in the flow direction by the balloon 50 but also the change in flowing speed caused by the embolization, the user can more deeply understand the embolization treatment.

The first water tank 116 is provided with discharge ports 161 to 168 that are outlets of the liquid L discharged from the tissue model 120, and a drain tube 170 that causes the liquid L accumulated in the first water tank 116 to flow back to the second water tank 110. The discharge ports 161 to 168 are provided by being respectively corresponded to the connection ports 141 to 148 at the terminals of the tissue model 120. The discharge ports 161 to 168 are respectively coupled to the connection ports 141 to 148 through the pipes 151 to 158.

Figure 12:
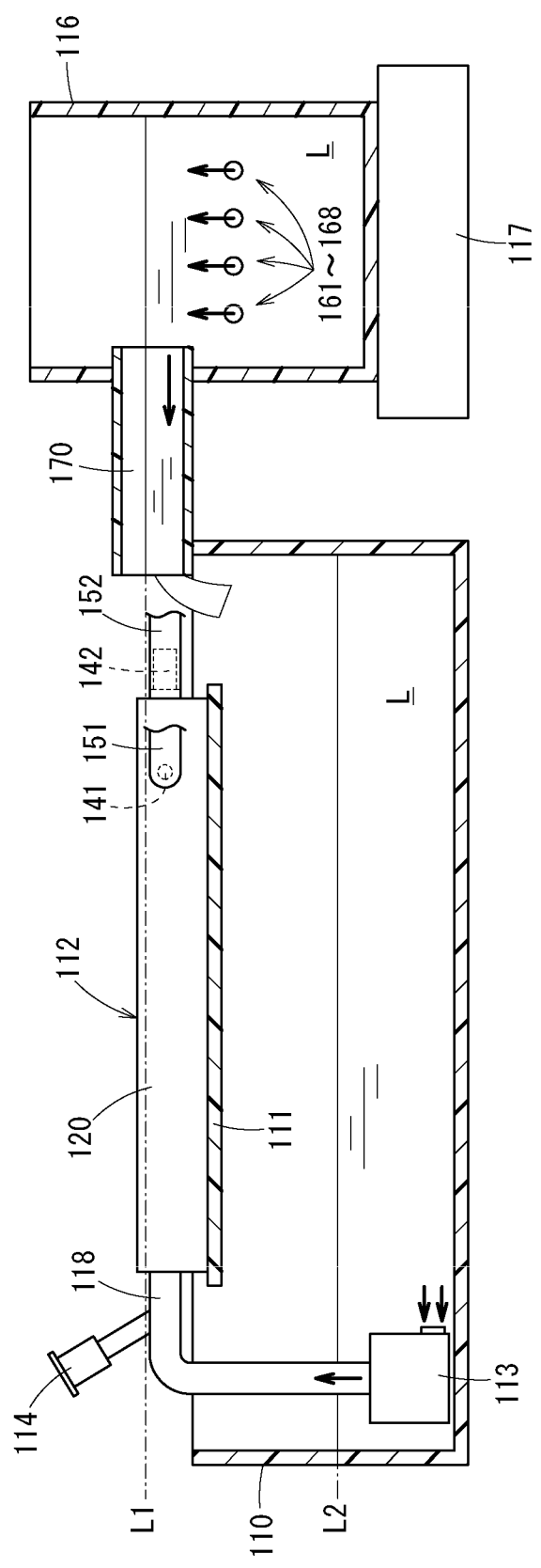
FIG. 12 is an explanation view illustrating a positional relationship in the height direction, of a first water tank, a second water tank, and a tissue model of the technique simulator according to the third embodiment.

As illustrated in FIG. 12, the discharge ports 161 to 168 are opened on a side wall part of the first water tank 116. These discharge ports 161 to 168 are opened at positions lower than the drain tube 170 so as to be positioned lower than the liquid surface L1 of the liquid L that is stored in the first water tank 116. Meanwhile, the drain tube 170 is provided at the approximate same height as the tissue model 120. The drain tube 170 extends from the first water tank 116 toward the second water tank 110, and is configured to cause the liquid L collected in the first water tank 116 to flow back to the second water tank 110. When the position of the liquid surface L1 of the first water tank 116 becomes the height of the drain tube 170, the liquid L flows back to the second water tank 110, so that the position of the liquid surface L1 of the first water tank 116 becomes the same height as the drain tube 170. A support member 117 is disposed under the first water tank 116. The support member 117 is set such that the height of the drain tube 170 is approximately the same as or slightly higher than the height of the tissue model 120. The height of the liquid surface L1 is the same as the height of the tissue model 120, so that the tissue model 120 is filled with the liquid L all the time and the liquid L can be slowly flowed so as to allow a pressure difference in the tissue to be reproduced.

Note that, the drain tube 170 is preferably formed to have an inside diameter that prevents the overflow with respect to the flow rate of the liquid L that flows in via the discharge ports 161 to 168. Accordingly, the inside diameter of the drain tube 170 is preferably set such that a cross-sectional area A of the drain tube 170 is 60% or more relative to a total B of flow path cross-sectional areas of the eight pipes 151 to 158, for example. In a case where the inside diameter of each of the pipes 151 to 158 is 2.1 mm, the total B of the flow path cross-sectional areas becomes 33.94 mm$^2$. In this case, when the inside diameter of the drain tube 170 is 10 mm, the cross-sectional area A is 28.14 mm$^2$, A is 83% relative to B, so that the discharge of the liquid L from the first water tank 116 can reliably be conducted. Accordingly, the inside diameter of the drain tube 170 may be set to 10 mm or more, and can be set, for example, to about 10 to 12 mm.

Accordingly, the discharge ports 161 to 168 are coupled below the liquid surface L1 of the first water tank 116. Accordingly, it is possible to circulate the liquid L that imitates blood without increasing the internal pressure of the flow path 160 of the tissue model 120 (see FIG. 1) and causing a backflow. Accordingly, it is possible to reduce the discharge pressure of the liquid L in a pump 113. Therefore, it is possible to make the flow of the liquid L in the flow path 160 gentle, and to reproduce a phenomenon such as the generation of a pressure difference and a backflow due to the pressure difference, under the gentle flow reproduction. In the present embodiment, in the points in the flow path 160 excluding the flow path before the bifurcation (the linear part 112b), in a case where training for operating the balloon 50 (see FIG. 14) is conducted, it is possible to keep the liquid surface of the first water tank 116 constant without providing the tube 101 as in FIG. 6. Therefore, the liquid surface height of the first water tank 116 can be kept constant, so that it is possible to generate a pressure difference with respect to the bifurcated flow path that imitates a normal liver tissue with stability over a long period of time.

The pump 113 is provided in the second water tank 110. The pump 113 is coupled to the end portion 112a of the tissue model 120 through a tube 118. The pump 113 pumps up the liquid L in the second water tank 110 to supply the liquid L to the flow path 160 of the tissue model 120. The flow pressure by the pump 113 is a pressure in accordance with the position of the liquid surface L1 of the first water tank 116 and the flow resistance of the liquid L.

A catheter insertion port 114 for interposing the catheter 46 (see FIG. 2) into the flow path 160 of the tissue model 120 is provided to the tube 118. The catheter insertion port 114 simulates an insertion port from which the catheter 46 is inserted into a blood vessel. The catheter insertion port 114 is provided with a valve, which is not illustrated, that allows the catheter 46 to be inserted and prevents the liquid L from leaking into in the flow path 160.

Next, an effect of the technique simulator 10C configured as the above will be described.

Figure 14:
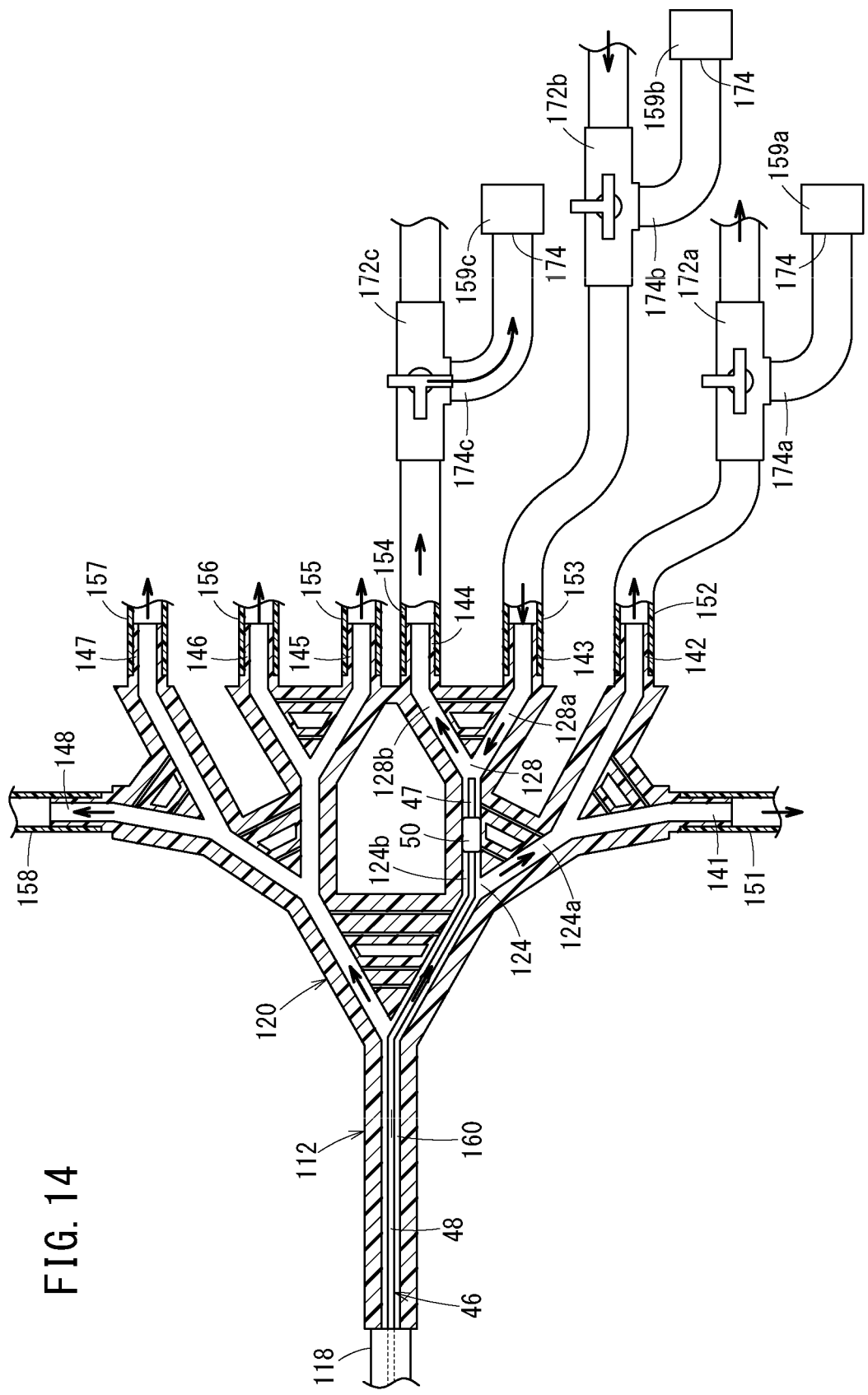
FIG. 14 is an effect explanation view of the technique simulator according to the third embodiment (Part 1).

The catheter 46 for use in the technique simulator 10C is inserted into the flow path 160 of the tissue model 120 via the catheter insertion port 114 (see FIG. 11). The three-way stopcock 172 provided to the pipe 154 causes the pipe 154 of the connection port 144 to communicate with the tumor simulation pipe 174c, and simultaneously stops a flow to a side of the first water tank 116. As illustrated in FIG. 14, the three-way stopcock 172c provided to the pipe 154 causes the pipe 154 of the connection port 144 to communicate with the tumor simulation pipe 174c, and simultaneously stops the flow to the side of the first water tank 116. The other connection ports 141 to 143 and 145 to 148 communicate with the first water tank 116. Therefore, it is possible to consider the connection port 144 as a blood vessel to be coupled to a simulated tumor part, and the other connection ports 141 to 143 and 145 to 148 as blood vessel to be connected to normal tissues. A flow path toward the connection port 144 corresponds to the first bifurcated flow path, and flow paths toward the other connection ports 141 to 143 and 145 to 148 correspond to the second bifurcated flow paths. The user inflates the balloon 50 in a portion upstream of the third bifurcated portion 128 to occlude the second bifurcated flow path 124b. Further, the user administers a colored water or a coloration embolic agent that imitates a therapeutic agent from the terminal opening 47 of the catheter 46. At this time, the colored water or the coloration embolic agent receives no pressure by the pump 113 because of the occlusion by the balloon 50. Accordingly, the colored water or the coloration embolic agent to which only the pressure at the time of the injection is applied is flowed toward the downstream side, in other words, a multi-end portion of the tumor simulation pipe 174c.

In FIG. 14, with the three-way stopcock 172c, in the third bifurcated flow path 128b, the liquid L is discharged with priority through the tumor simulation pipe 174c corresponding to the simulated tumor. Meanwhile, at the side of the third bifurcated flow path 128a, the position of the liquid surface L1 of the first water tank 116 is at the approximate same height as the tissue model 120, so that the liquid L does not flow out from the connection port 143 to the side of the first water tank 116. In addition, at this time, the connection port 143 is in a state of being communicated with the first water tank 116 and of being not communicated with the tumor simulation pipe 174b, with the three-way stopcock 172b. Accordingly, such a phenomenon occurs that the liquid L is discharged from the third bifurcated flow path 128b, and the liquid L flows back from the third bifurcated flow path 128a to flow in toward the third bifurcated flow path 128b. Accordingly, such a phenomenon occurs that the colored water administered from the catheter 46 selectively flows to the third bifurcated flow path 128b along with the flow of the liquid L. In other words, the technique simulator 10C can reproduce the change in the flow of the liquid L similar to the technique simulators 10A and 10B.

In a case where the coloration embolic agent is used as a therapeutic agent, the filter 159 is clogged with the coloration embolic agent, so that the flow of the liquid L is gradually delayed and the flow is stopped before long. The user can visually confirm a treatment effect by the embolic agent. The embolic agent is captured by the filter 159, and thus does not flow in the second water tank 110. Accordingly, it is possible to continue the simulation of the technique thereafter that uses the different bifurcated flow path without any trouble. The used embolic agent can be removed and discarded with the filter 159 and the tumor simulation pipes 174a to 174c, so that the cleanup becomes suitably simple. In FIG. 14, by switching the three-way stopcock 172c to interrupt the flow of the liquid L to the first water tank 116, to switch the flow path to the tumor simulation pipe 174c, training can be conducted using the tumor simulation pipe 174c as a target site. After the training, the tumor simulation pipe 174c and the filter 159c can be removed from the three-way stopcock 172c and discarded.

Figure 15:
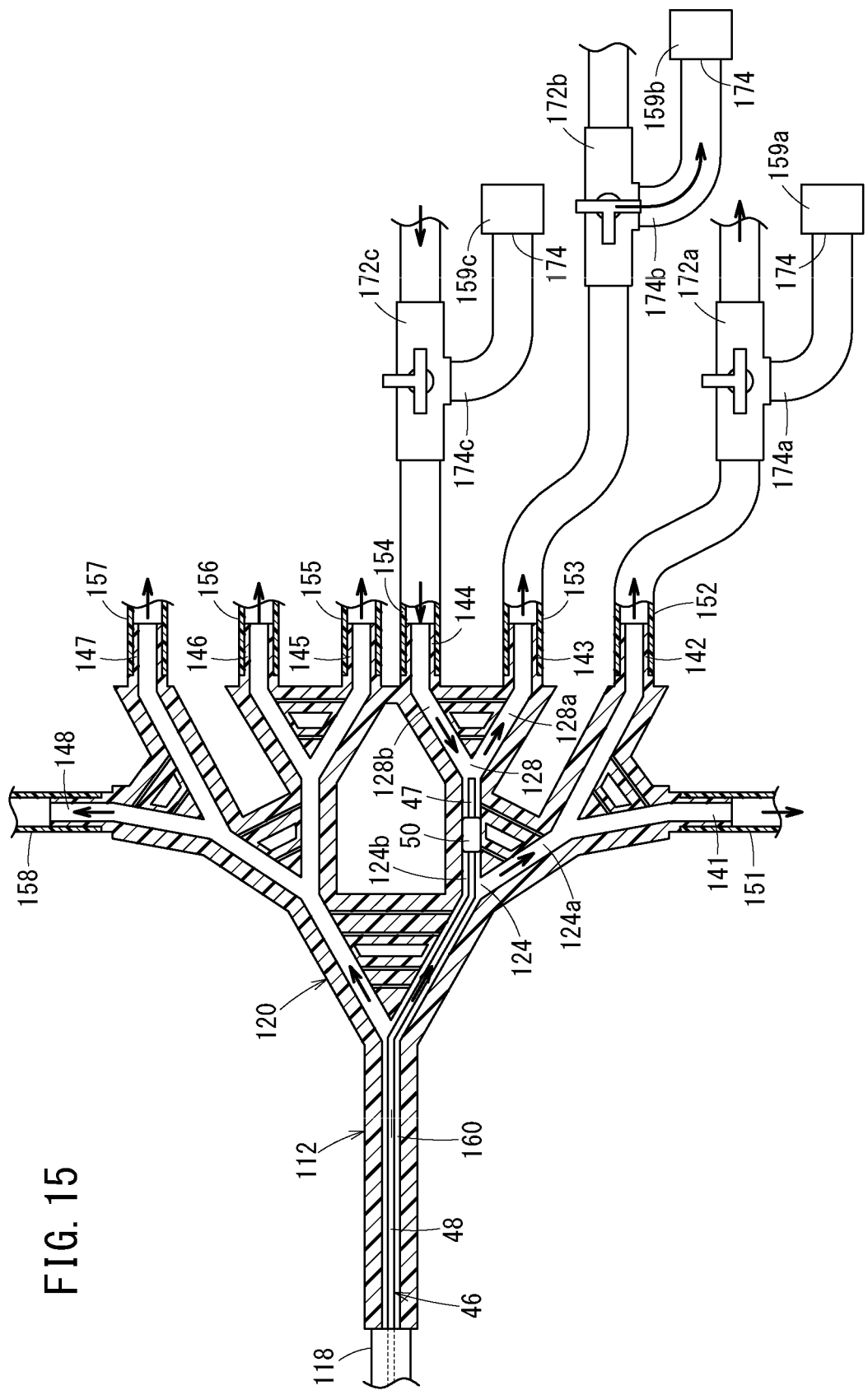
FIG. 15 is an effect explanation view of the technique simulator according to the third embodiment (Part 2).

Next, the communication state of the three-way stopcock 172 is switched so as to the position of the simulated tumor to the different third bifurcated flow path 128b. In the example illustrated in FIG. 15, the three-way stopcock 172c provided to the pipe 154 of the connection port 144 is operated to interrupt the flow to the tumor simulation pipe 174c, and to cause the connection port 144 to communicate with the first water tank 116. In addition, the three-way stopcock 172b provided to the pipe 153 of the connection port 143 is operated to cause the connection port 143 to communicate with the tumor simulation pipe 174b, and to interrupt the flow path from the connection port 143 to the first water tank 116. In other words, a simulated tumor is set in the downstream side of the connection port 143. The other connection ports 141, 142, and 144 to 148 are caused to communicate with the first water tank 116, and thus can simulate normal tissues. In other words, the first bifurcated flow path is switched to the flow path toward the connection port 143, and the flow paths toward the other connection ports 141, 142, and 144 to 148 become the second bifurcated flow paths.

In this case, at a portion upstream of the bifurcated portion 128, the balloon 50 is inflated to occlude the second bifurcated flow path 124b. Further, the user administers a colored water or a coloration embolic agent that imitates a therapeutic agent from the terminal opening 47 of the catheter 46. In third bifurcated flow path 128a, the liquid L is flowed out with priority through the tumor simulation pipe 174b of the connection port 143 corresponding to the simulated tumor. Meanwhile, in the third bifurcated flow path 128b, the position of the liquid surface L1 of the first water tank 116 is at the approximate same height as the tissue model 120, so that the liquid L hardly flows out from the connection port 143. Accordingly, such a phenomenon occurs that the liquid L is discharged from the third bifurcated flow path 128a, and the liquid L flows back from the third bifurcated flow path 128b to flow in toward the third bifurcated flow path 128a. Accordingly, such a phenomenon occurs that the colored water or the coloration embolic agent administered from the catheter 46 selectively flows to the third bifurcated flow path 128a that is connected to the simulated tumor along with the flow of the liquid L.

In this manner, by only operating the three-way stopcock 172, a bifurcated flow path connected to the simulated tumor can be changed, and the simulation of the technique using the plurality of the bifurcated flow paths 124a to 134b can easily be conducted.

Therefore, it is possible to conduct the training by switching between the bifurcated flow path connected to the simulated tumor and the bifurcated flow path connected to the simulated normal tissue in a simplified manner.

The technique simulator 10C according to the present embodiment is provided with the first water tank 116 that stores the liquid L therein, the plurality of the pipes 151 to 158 that respectively couple the plurality of the third bifurcated flow paths 126a to 134b to the first water tank 116, the tumor simulation pipes 174a to 174c that are provided at least one of the plurality of pipes 151 to 158, are bifurcated from the pipes 151 to 158, and have the ends 174 that are set at positions lower than the liquid surface L1 of the first water tank 116, and the three-way stopcocks 172a to 172c (flow path switching units) that are provided to the bifurcated portions of the pipes 151 to 158 and the tumor simulation pipes 174a to 174c, and cause the tumor simulation pipes 174a to 174c to selectively communicate with either one of the first water tank 116 and the tumor simulation pipes 174a to 174c. With this configuration, by only operating the three-way stopcocks 172a to 172c, a site of the simulated tumor can be changed, and the technique simulation using the plurality of the third bifurcated flow paths 126a to 134b in the tissue model 120 can be easily conducted.

In the abovementioned technique simulator 10C, the second bifurcated flow paths 124a to 130b and the third bifurcated flow paths 126a to 134b are at the same height as the liquid surface L1 of the first water tank 116. With this configuration, a difference pressure other than the pressure difference necessary for the reproduction of the simulated tumor is not caused to generate in the bifurcated flow paths 124a to 134b. Accordingly, the homogeneous training with high reproducibility can be conducted.

In the abovementioned technique simulator 10C, the end 174 of each of the tumor simulation pipes 174a to 174c includes the filter 159. The filter 159 allows the embolic agent that is used as a therapeutic agent to be isolated and removed while recovering the liquid L. This reduces mixing of the embolic agent into the flow path 160, and allows a state in which the embolic agent is accumulated from the filter 159 toward the tumor simulation pipes 174a to 174c to be confirmed. At this time, by the adhesion of the colored embolic agent, the embolized state can suitably be visually confirmed. Moreover, the filter 159 after use can be removed from the tissue model 120 with at least one of the tumor simulation pipes 174a to 174c and discarded, which eliminates the processing of the embolic agent having being mixed into the tissue model 120 and the flow path 160, so that the cleanup work can be simplified.

In the abovementioned technique simulator 10C, the tissue model 120 may be configured such that the bifurcated flow path are bifurcated to be linearly symmetrical about the long axis direction of the flow path (the linear part 112b) before the bifurcation as an axis. Therefore, the flow path lengths of the left-right bifurcated flow paths become the approximate same, so that when the position of the simulated tumor (the filter 159) is switched between left and right sides, the simulation of the technique can be conducted under the equivalent condition.

In the abovementioned technique simulator 10C, the tissue model 120 may be configured such that the flow path is bifurcated in an approximately isosceles triangle shape or an equilateral triangle shape with the bifurcated portions 122 to 134 as vertices. In addition, in this case, the tissue model 120 may be formed such that the lengths from the first bifurcated portion 122 to the connection ports 141 to 148 at the terminal are approximately the same. Therefore, even when the simulated tumor (the tumor simulation pipes 174a to 174c and the filter 159) are coupled to any of the third bifurcated flow paths 126a to 134b, the simulation of the technique can be conducted under the equivalent condition.

In the abovementioned technique simulator 10C, the second water tank 110 having the liquid surface L2 at a position lower than the liquid surface L1 of the first water tank 116 is provided, and the pump 113 (liquid flow generation member) may pump up the liquid L in the second water tank 110 and supply the liquid L to the flow path 160 at the upstream side. In this case, the drain tube 170 that causes the liquid L in the first water tank 116 to flow back to the second water tank 110 may be provided. Therefore, the liquid L can be used by being circulated, and thus the simulation of the technique can be conducted over a long period of time.

Note that, a clamp (flow rate adjuster) may be attached to all or apart of the pipes 151 to 158 that are coupled to the tissue model 120. The clamp can reduce the cross-sectional area of the flow path of each of the pipes 151 to 158. In other words, the clamp changes the cross-sectional area of each of the pipes 151 to 158, so that the flow resistance (flow rate) can be changed. When the flow resistance of each of the pipes 151 to 158 is increased by the clamp with respect to the liquid L flowing in by the pump 113 at the constant flow rate, the internal pressure of the bifurcated flow path to which the clamp is coupled is increased, so that the pressure difference can be caused to generate. In other words, the clamp can function as the pressure difference generation member. Therefore, it is possible to further complicate the generation condition for the pressure difference, and conduct training for the experienced persons.

Figure 16:
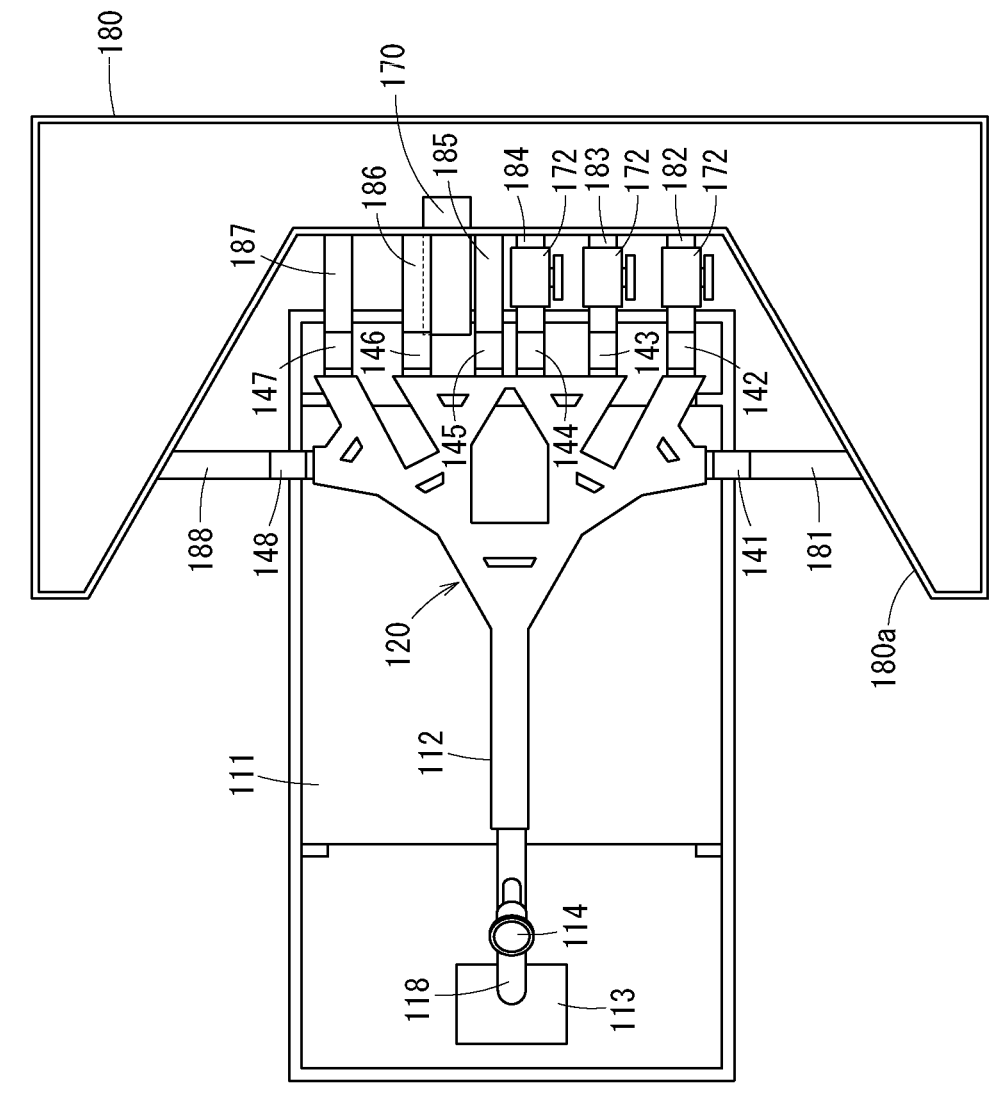
FIG. 16 is a plan view of a technique simulator according to a modification example of the third embodiment.

In a technique simulator 10D according to a modification example of the third embodiment in FIG. 16, a first water tank 180 is formed in a C-character shape seen from the upper side. In the first water tank 180, a side portion 180a is formed so as to surround the connection ports 141 to 148 in the tissue model 120, in order that the distances from the respective connection ports 141 to 148 at the terminal in the tissue model 120 to the first water tank 180 are substantially the same. Tubes 181 to 188 are respectively coupled to the connection ports 141 to 148. The tubes 181 to 188 are coupled to the side portion 180a of the first water tank 180, and communicate with the first water tank 180. The respective tubes 181 to 188 are formed so as to have the substantial same length, and the respective bifurcated flow paths are configured such that the lengths of flow paths including the tubes 181 to 188 are approximately the same. Moreover, the drain tube 170 may be included.

In this manner, the respective bifurcated flow paths have the identical length, so that the flow resistances of the bifurcated flow paths become approximately the same. Accordingly, when a more gentle flow of a fluid is used, a pressure difference can easily be caused to generate, and can reproduce a backflow due to the pressure difference. Accordingly, the simulation of the technique can be conducted under the condition being closer to the actual tissue.

The present invention is not limited to the abovementioned examples. Rather, various modifications are possible without deviating from the spirits of the invention.

REFERENCE NUMERAL LIST 10A, 10B, 10C, 10D . . . technique simulator
12, 60, 160 . . . flow path
13, 113 . . . pump (liquid flow generation member)
14 . . . catheter insertion port
16 . . . water tank
22, 122, 124, 126, 128, 130, 132, 134 . . . bifurcated portion
24, 74 . . . first bifurcated flow path
26, 76 . . . second bifurcated flow path
40, 88 . . . tube (pressure difference generation member)
62, 116 . . . first water tank
64, 110 . . . second water tank
151 to 158 . . . pipe
159 . . . filter
172 . . . three-way stopcock (flow path switching unit)
174a to 174c . . . tumor simulation pipe
L . . . liquid

The invention claimed is:

1. A technique simulator for training in a technique using a catheter, the technique simulator comprising:
    a flow path configured to contain a liquid that imitates blood;
    a liquid flow generation member configured to generate flow of the liquid; and
    a catheter insertion port configured to allow the catheter to be interposed into the flow path;
    wherein the flow path comprises:
        a bifurcated portion that is located downstream of the catheter insertion port and is to be bifurcated into at least two flow paths, and
        a plurality of bifurcated flow paths provided downstream of the bifurcated portion;
    wherein the plurality of bifurcated flow paths includes a first bifurcated flow path and a second bifurcated flow path;
    wherein the technique simulator further comprises a pressure difference generation member configured to cause a pressure difference to be generated between a downstream side of the first bifurcated flow path and a downstream side of the second bifurcated flow path;
    wherein the liquid flow generation member is configured to generate a pressure higher than pressures to be applied to the downstream side of the first bifurcated flow path and the downstream side of the second bifurcated flow path.

2. The technique simulator according to claim 1, wherein:
    the pressure difference generation member comprises a tube that is coupled to the downstream side of the second bifurcated flow path, the tube comprising a discharge port at a position lower than the second bifurcated flow path.

3. The technique simulator according to claim 1, wherein:
    the pressure difference generation member comprises a tube, the tube comprising a discharge port at a position higher than the first bifurcated flow path.

4. The technique simulator according to claim 1, further comprising:
    a flow path formation block in which the first bifurcated flow path and the second bifurcated flow path are formed.

5. The technique simulator according to claim 4, wherein:
    the flow path formation block has a panel shape.

6. The technique simulator according to claim 1, further comprising:
    a first container and a second container configured to store the liquid therein;
    wherein the first bifurcated flow path communicates with a first discharge port;
    wherein the second bifurcated flow path communicates with a second discharge port;
    wherein the first discharge port communicates with an inside of a storage tank of the first container;
    wherein the second discharge port communicates with an inside of a storage tank of the second container; and
    wherein the first container and the second container are configured such that, when the liquid is stored in the first container and the second container, a liquid surface of the liquid in the first container is at a position higher than a liquid surface of the liquid in the second container, the first discharge port is disposed at a position lower than the liquid surface of the liquid in the first container, the second discharge port is disposed at a position lower than the liquid surface of the liquid in the second container, and the first bifurcated flow path and the second bifurcated flow path are disposed at a height between the liquid surface of the liquid in the first container and the liquid surface of the liquid in the second container.

7. The technique simulator according to claim 6, further comprising:
    a discharge flow path that comprises an inlet disposed at a position higher than the first discharge port;
    wherein the discharge flow path is configured to allow the liquid to be discharged through the discharge flow path from the first container to the second container.

8. The technique simulator according to claim 1, wherein:
    the first bifurcated flow path comprises a plurality of first small-diameter bifurcated flow paths each having an inside diameter smaller than that of other points in the first bifurcated flow path; and the second bifurcated flow path comprises a plurality of second small-diameter bifurcated flow paths each having an inside diameter smaller than that of other points in the second bifurcated flow path.

9. The technique simulator according to claim 1, wherein: the flow path comprises an interlock flow path that imitates a collateral blood flow.

10. The technique simulator according to claim 1, further comprising:

a first container configured to store the liquid therein; and a plurality of pipes that respectively couple the plurality of the bifurcated flow paths to the first container;

wherein pressure difference generation member comprises a tumor simulation pipe that has a first end portion coupled to at least one of the plurality of the pipes and a second end portion that is located at a position lower than a liquid surface of the first container when the liquid is stored in the first container; and wherein the technique simulator further comprises a flow path switching unit that is coupled to a bifurcated portion between the pipe and the tumor simulation pipe, and is configured to cause the bifurcated flow path to selectively communicate with either one of the first container and the tumor simulation pipe.

11. The technique simulator according to claim 10, further comprising:

a filter configured to allow the liquid to pass therethrough, the filter being located in the second end portion of the tumor simulation pipe.

12. The technique simulator according to claim 10, wherein:

the plurality of bifurcated flow paths are linearly symmetrical with each other about a direction of the flow path before the bifurcation as an axis, and the plurality of the bifurcated flow paths have lengths identical with each other.

13. The technique simulator according to claim 12, wherein:

the plurality of the pipes that respectively couple the plurality of the bifurcated flow paths to the first container have lengths identical with each other.

14. The technique simulator according to claim 13, wherein:

the pressure difference generation member further comprises a flow rate adjuster configured to change a flow path cross-sectional area of the pipe.

15. The technique simulator according to claim 10, further comprising:

a second container configured such that, when the liquid is stored in the second container, a liquid surface of the liquid in the second container is at a position lower than the liquid surface of the liquid in the first container, wherein the liquid flow generation member is configured to pump up and supply the liquid in the second container to the flow path at an upstream side.

16. The technique simulator according to claim 15, further comprising:

a drain tube configured to cause the liquid in the first container to flow back to the second container.

17. A technique simulator for training in a technique using a catheter, the technique simulator comprising:

a flow path configured to contain a liquid that imitates blood;

a pump configured to generate flow of the liquid; and a catheter insertion port configured to allow the catheter to be interposed into the flow path;

wherein the flow path comprises:

a bifurcated portion that is located downstream of the catheter insertion port and is to be bifurcated into at least two flow paths, and a plurality of bifurcated flow paths provided downstream of the bifurcated portion;

wherein the plurality of bifurcated flow paths includes a first bifurcated flow path and a second bifurcated flow path;

wherein the technique simulator further comprises a tube configured to cause a pressure difference to be generated between a downstream side of the first bifurcated flow path and a downstream side of the second bifurcated flow path;

wherein the pump is configured to generate a pressure higher than pressures to be applied to the downstream side of the first bifurcated flow path and the downstream side of the second bifurcated flow path.

18. A method of using a technique simulator for training in a technique using a catheter, the method comprising:

providing a technique simulator comprising:

a flow path;

a liquid flow generation member; and a catheter insertion port configured to allow the catheter to be interposed into the flow path;

wherein the flow path comprises:

a bifurcated portion that is located downstream of the catheter insertion port and is to be bifurcated into at least two flow paths, and a plurality of bifurcated flow paths provided downstream of the bifurcated portion;

wherein the plurality of bifurcated flow paths includes a first bifurcated flow path and a second bifurcated flow path;

wherein the technique simulator further comprises a pressure difference generation member;

providing a liquid that imitates blood in the flow path;

using the liquid flow generation member to generate a flow of the liquid;

while the catheter is interposed in the flow path, using the pressure difference generation member to cause a pressure difference to be generated between a downstream side of the first bifurcated flow path and a downstream side of the second bifurcated flow path, and using the liquid flow generation member to generate a pressure higher than pressures to be applied to the downstream side of the first bifurcated flow path and the downstream side of the second bifurcated flow path.

\* \* \* \* \*